(12) United States Patent
Kasten

(10) Patent No.: US 10,715,009 B1
(45) Date of Patent: Jul. 14, 2020

(54) HYDRO ELECTRIC POWER GENERATION SYSTEM

(71) Applicant: Gene D. Kasten, Bend, OR (US)

(72) Inventor: Gene D. Kasten, Bend, OR (US)

( * ) Notice: Subject to any disclaimer, the term of this patent is extended or adjusted under 35 U.S.C. 154(b) by 0 days.

(21) Appl. No.: 16/400,330

(22) Filed: May 1, 2019

(51) Int. Cl.
*H02K 7/18* (2006.01)
*F03B 17/06* (2006.01)

(52) U.S. Cl.
CPC ......... *H02K 7/1823* (2013.01); *F03B 17/061* (2013.01); *F05B 2220/32* (2013.01); *F05B 2220/706* (2013.01)

(58) Field of Classification Search
CPC . H02K 7/1823; F03B 17/061; F05B 2220/32; F05B 2220/706
See application file for complete search history.

(56) References Cited

U.S. PATENT DOCUMENTS

| | | | | |
|---|---|---|---|---|
| 980,666 A * | 1/1911 | Overfield | ................ | F03B 7/003 60/639 |
| 1,459,645 A * | 6/1923 | Wilson | .................... | F03B 17/02 60/640 |
| 3,984,698 A * | 10/1976 | Brewer | ................... | F03B 7/003 290/54 |
| 4,260,902 A * | 4/1981 | Crider | ...................... | F03B 3/08 290/43 |
| 4,385,497 A * | 5/1983 | Scott | ....................... | F03B 7/003 415/916 |
| 6,210,113 B1 * | 4/2001 | Ihrenberger | ............ | F03B 7/003 415/141 |
| 8,297,055 B2 * | 10/2012 | Ackman | ................. | F03B 17/00 60/640 |
| 9,890,761 B2 * | 2/2018 | Kasten | .................... | F03B 11/06 |
| 2013/0270835 A1 * | 10/2013 | Pingitore | .............. | F03B 17/005 290/1 A |
| 2015/0204300 A1 * | 7/2015 | Kasten | .................... | F03B 7/003 290/52 |
| 2017/0107967 A1 * | 4/2017 | Kasten | .................... | F03B 11/06 |

* cited by examiner

*Primary Examiner* — Viet P Nguyen
*Assistant Examiner* — Joseph Ortega
(74) *Attorney, Agent, or Firm* — St. Onge Steward Johnston & Reens LLC

(57) ABSTRACT

A hydro-electric power generation system that converts falling water energy into rotational energy that is used to generate electricity. The mechanical portion of the device including a rotating platform with a track positioned thereon with angled portions that allow water-filled buckets to move downward thereby rotating the platform. Alternate buckets filled and then emptied causing continual rotation of the platform as long as a water source continues to provide a stream of water to the device.

29 Claims, 20 Drawing Sheets

HYDRO ELECTRIC POWER GENERATION SYSTEM

FIELD OF THE INVENTION

The invention relates to power generation systems and, more particularly, to hydroelectric power systems having enhanced torque capabilities and low ecological impact.

BACKGROUND OF THE INVENTION

Dwindling non-renewable energy sources, along with the negative environment impact associated with consuming non-renewable energy sources, has greatly increased the demand for renewable energy. One form of renewable energy is hydroelectric power, in which the flow of fluid, such as water, is utilized to generate electrical energy. Some of the advantages of hydroelectric power include use of an energy source is sustainable (e.g., as rain falls it replenishes a river where the equipment is located) and the flow of water is relatively "clean" (e.g., there is very little generation of unwanted byproducts such as is created by the burning of fossil fuels).

A water wheel is one form of hydroelectric equipment that converts the energy of free-flowing or falling water into rotational energy. A water wheel consists of a large wheel with a number of blades or containers arranged on an outside rim forming a driving surface. Water is typically diverted from a water source (e.g., a river) or storage basin along a channel or pipe and the downward force exerted on the blades or containers drives the wheel, which in turn rotates an axle that may drive other machinery. Water leaving the wheel may be drained through a channel but may also be directed into yet another wheel, turbine or mill. The passage of water may be controlled by sluice gates that allow maintenance and some measure of flood control.

Water wheels have traditionally been used with watermills, where the water wheel drives a mechanical process such as flour, lumber or textile production, or metal shaping (rolling, grinding or wire drawing). However, modern hydroelectric dams have taken advantage of downward water flow due to gravitational forces.

One major drawback of known hydroelectric power systems is the negative environmental impact the structures can have on the environment. For example, typically dams are erected on a running water source, such as a river, and are used to generate a steady supply of falling water that is used for generation of electricity. However, it is well known that placing barriers in a river can negatively impacts the animal life naturally occurring in the river, even preventing some species from migrating to spawning grounds. These barriers can have unanticipated negative effects on still other animal species that are affected by the decline of the species blocked or hindered by the hydroelectric equipment.

In an attempt to mitigate the negative effects such equipment causes, bypasses have been provided in dams to allow various species to move up and down a river past the hydro-electric equipment. However, such bypasses have only been marginally effective as the vast majority of the water way still remains blocked.

Known systems also suffer from other deficiencies, including a lack of efficiency and the inability to scale down their size for smaller uses. One system that has effectively allowed for scaled down use is taught in U.S. Pat. No. 9,890,761 to Kastan ("the '761 patent"), which discloses a wheel that is driven by falling water and includes at least two containers supported by beams on an outer end where the ends are each adapted to allow the containers to travel along a length of the support beam. Accordingly, a container is allowed to travel outward relative to an axis of rotation of the wheel, when the container is filled with a fluid when the wheel rotates causing the beam travel downward relative to the ground. The weight of the fluid and the container cause the container to travel outward providing enhanced rotational torque due to the increased distance from the container to the axis of rotation. Conversely, an opposing empty container is moved inward toward the axis of rotation reducing the resistance caused by the lifting of the container. While the '761 patent was a major improvement over known systems, the design of the system was limited in that a maximum torque created by the outward moving container is limited to a relatively small number of containers within an angular range of the wheel that are on a downward trajectory.

Therefore, it would be beneficial to have a superior system and method for low environmental impact generation of hydroelectric power.

SUMMARY OF THE INVENTION

Accordingly, what is desired then is a hydro-electric system for generation of electrical power that provides increased torque without requiring more falling water than known systems.

It is further desired to provide a system and method of electricity generation that utilizes hydro-electrical principles to more efficiently convert falling water into rotational torque, which in turn can be utilized to generate electrical energy.

It is still further desired to provide a system and method for providing scalable and highly efficient hydro-electric power generation that will have very minimal impact on the ecology of the surrounding area.

In one configuration a hydro-electric power generation system is provided in which a hub is provided including a plurality of arms extending radially from the hub. The hub sits on a base mounted on the ground. A platform is provided that is adapted to rotate relative to the hub about an axis. A track is provided extending about a periphery of the platform. The arms are provided with containers connected to distal ends of the arms and are designed to hold a fluid. Each container includes a supporting mechanism that is designed to engage with and run along the track to provide support for each container. The track is provided having an alternating set of high points and low points where the container is filled with the fluid as a high point such that gravity causes the container to move downward, which causes the platform to rotate due to the angle of the track and travel from the high point toward the low point. Once the arm reaches the low point (i.e., the platform rotates the track), the fluid is expelled from the container and an adjacent container that is positioned at a high point, is filled with the fluid such that the adjacent container will then move toward the next low point again causing the platform and associated track to rotate relative to the hub such that the previous container is advanced from the low point to the next high point where it will be refilled. This cycle is repeated causing the platform to continually rotate as long as the fluid continues to be placed in the containers at the respective high points.

In one configuration the platform is a disk-shaped device and the track appears as a series of A-frames attached to the outer edge of the platform. The fluid-filled containers move downward, which causes the platform and track to rotate such that the containers "travel" along the track in a clockwise manner. The arms may be attached to the hub by a hinge arrangement that allows the arm to freely move upward and downward, but prevents any lateral movement and thereby causes the rotation of the platform. The hub and the base are fully stationary. This will function to allow for a more accurate water delivery system from a circular (concentric) tank that may be positioned just above the containers when they reach the highest point on the track (e.g., the containers are perfectly aligned below the points where they are filled and never moved laterally). A lever may be mounted to each container that is adapted to release a latch on a trap door for water delivery at the containers highest point to fill the container. Alternatively, a lever on the platform will affect water release at the container's lowest point on the track.

In one configuration, when the container is at the lowest point on the track, a door in the bottom of the container will be triggered to open and the water will drop out through the open door. The platform is provided with a series of openings to allow the water to pass through with each opening corresponding to the lowest parts of the track. In one configuration the openings are provided with a series of slanted blades such that when the water drops through the blades, the weight of the water adds force to the rotation of the platform.

It is further contemplated that depending on the size of the device, multiple rows of tubs could be mounted. For example, if a high water-head is available, multiple platforms and containers could be stacked, one above the other, reusing the same water multiple times as it falls from a top tank into a top container and then out through the bottom of the top container through a top platform to be collected in a bottom tank. The process could then be repeated for a bottom container and platform.

In another configuration, a gear box and generating device may be mounted above the tank so that the rotation of the platform functions to providing rotating force to the generating device for the generation of electrical energy.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, components, systems, subsystems, and/or means, constituting any one or more of (a) a connection, whether direct or through one or more other devices, components, systems, subsystems, or means, (b) a communications relationship, whether direct or through one or more other devices, apparatus, components, systems, subsystems, or means, and/or (c) a functional relationship in which the operation of any one or more devices, components, systems, subsystems, or means depends, in whole or in part, on the operation of any one or more others thereof.

A hydro-electric power system for transforming mechanical power to electrical power and including an electrical power generator and a mechanical device coupled to the generator is provided, the mechanical device generating rotational power and comprising a hub, a first arm having a first end coupled to the hub via a hinge allowing the first arm to extend radially from and move relative to the hub, and a first container coupled to a second end of the the arm, and a first supporting mechanism associated with the first container or the first arm. The hydro-electric power system further comprises a second arm having a first end coupled to the hub via a hinge allowing the second arm to extend radially from and move relative to the hub, a second container coupled to a second end of the second arm, and a second supporting mechanism associated with the second container or the second arm. The hydro-electric power system still further comprises a base upon which the hub is positioned, a platform adapted to rotate relative to the hub about an axis of rotation, and a track positioned on a periphery of the platform, the track having high points and low points with sections of track connected therebetween. The hydro-electric power system is provided such that the first supporting mechanism engages with the track such that the first arm and the first container are supported by the track via the first supporting mechanism and the second supporting mechanism engages with the track such that the second arm and the second container are supported by the track via the second supporting mechanism. The hydro-electric power system is provided such that when the first container is at least partially filled with a fluid at a first high point of the track, the platform rotates causing the track to rotate such that the first container advances from the first high point toward a first low point of the track via a section of track connecting the first high point to the first low point. The hydro-electric power system is further provided such that when the second container is emptied at a second low point of the track, the platform rotates causing the track to rotate such that the second container travels from the second low point toward a second high point of the track via a section of track connecting the second low point to the second high point.

Other objects of the invention and its particular features and advantages will become more apparent from consideration of the following drawings and accompanying detailed description.

DETAILED DESCRIPTION OF THE INVENTION

Figure 1:
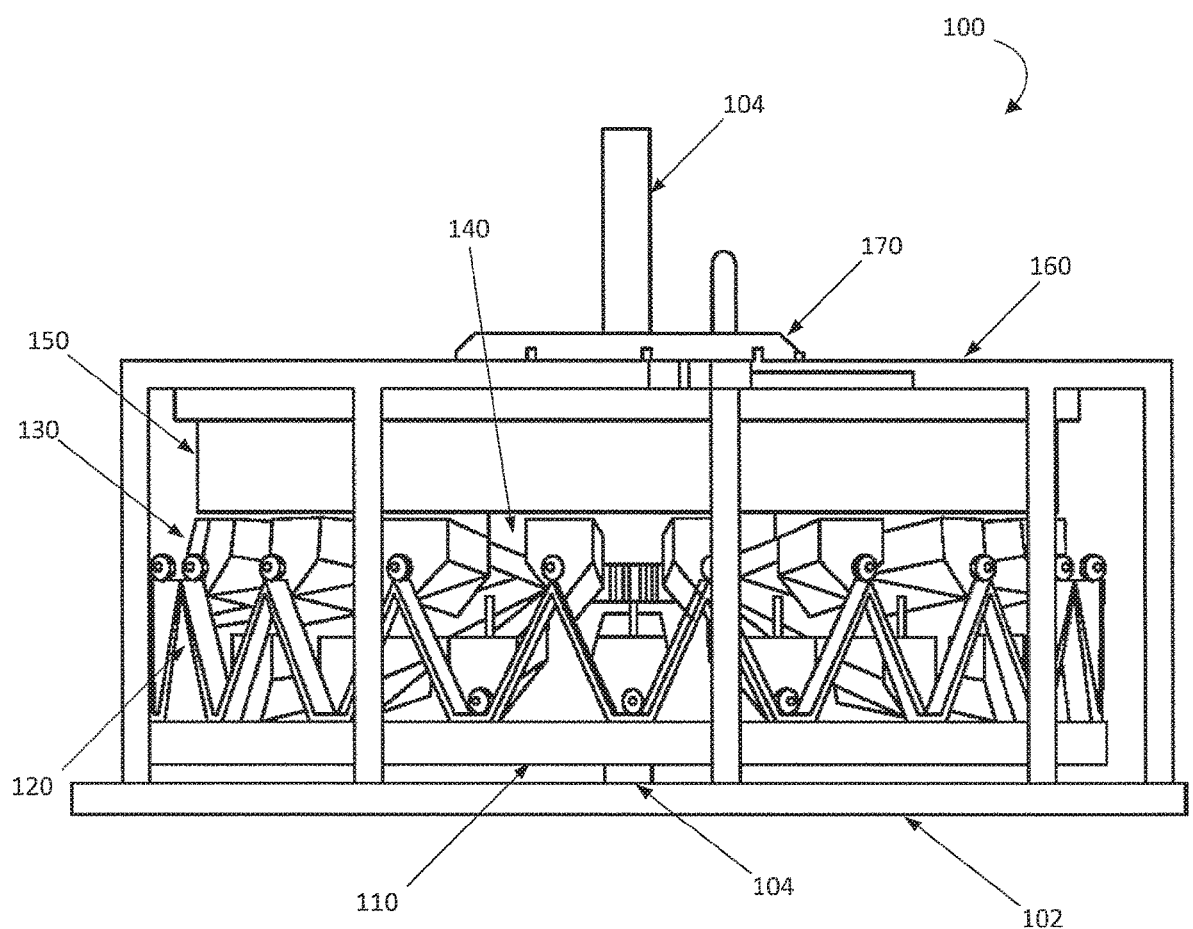
FIG. 1 is a side view illustration of one configuration of the hydro-electric power system.

Referring now to the drawings, wherein like reference numerals designate corresponding structure throughout the views.

Figure 6:
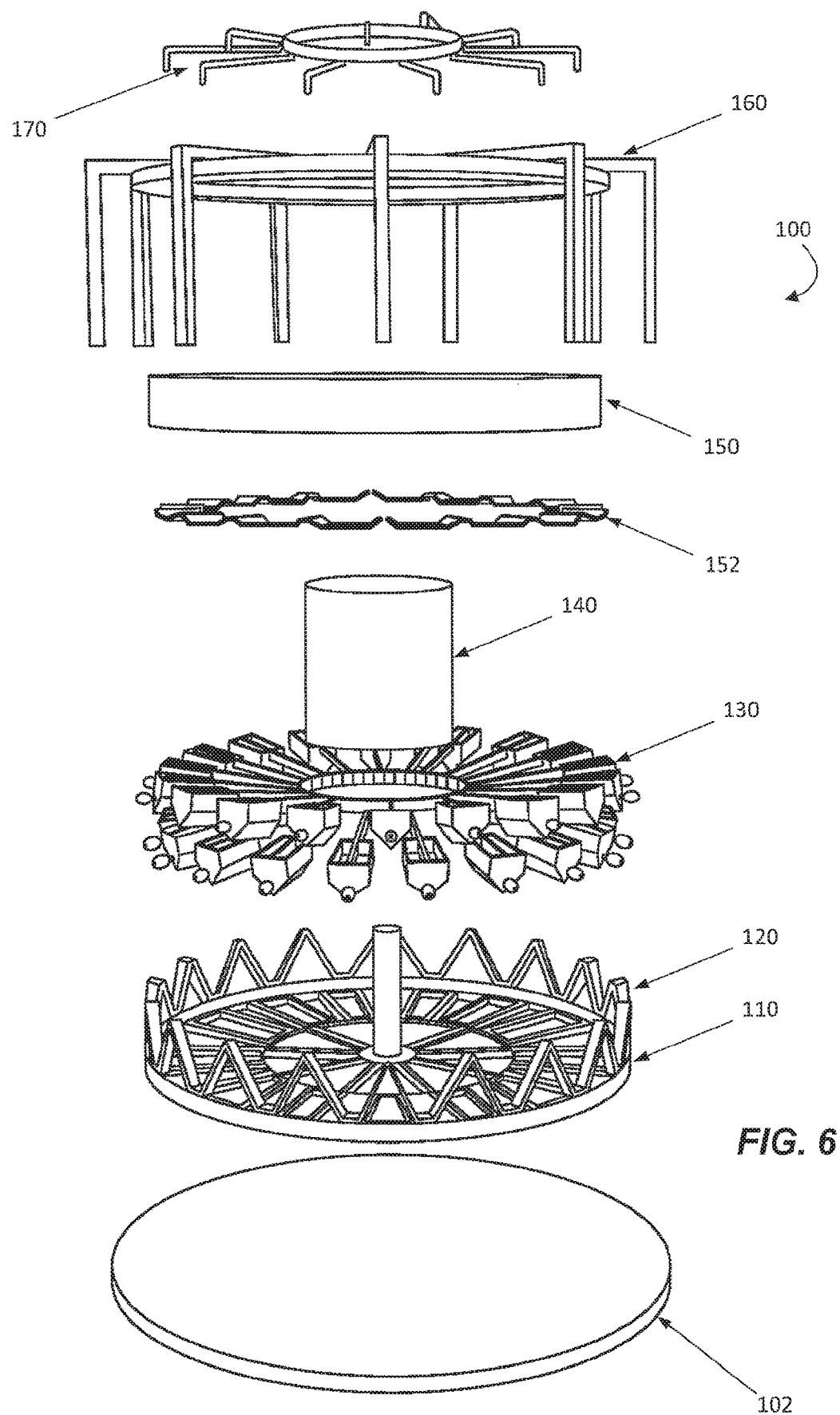
FIG. 6 is an exploded perspective view illustration of the hydro-electric power system according to FIG. 1.

FIG. 1 is a side view of the hydro-electric power system 100 according to one configuration of the system, while FIG. 6 is an exploded view of the major components of the system 100. FIG. 6 illustrates various components including a base 102 that is designed to sit on a flat surface and support the structure, a platform 110 formed as a disk-shaped unit that is designed to rotate relative to the base 102. The platform 110 further includes a track 120 that is provided as a series of A-frames that are connected to each other. A plurality of containers 130 that are connected to a stationary hub 140 are also provided. A tank 150 is provided that includes a series of doors 152 that can be activated to allow water to pass through. The water is distributed by a distribution system 170 that is connected to a source of water and allows for even distribution of water into the concentric tank 150. Additionally, a supporting structure 160 is provided to support the tank and water and various equipment positioned on top of the system 100.

Figure 2:
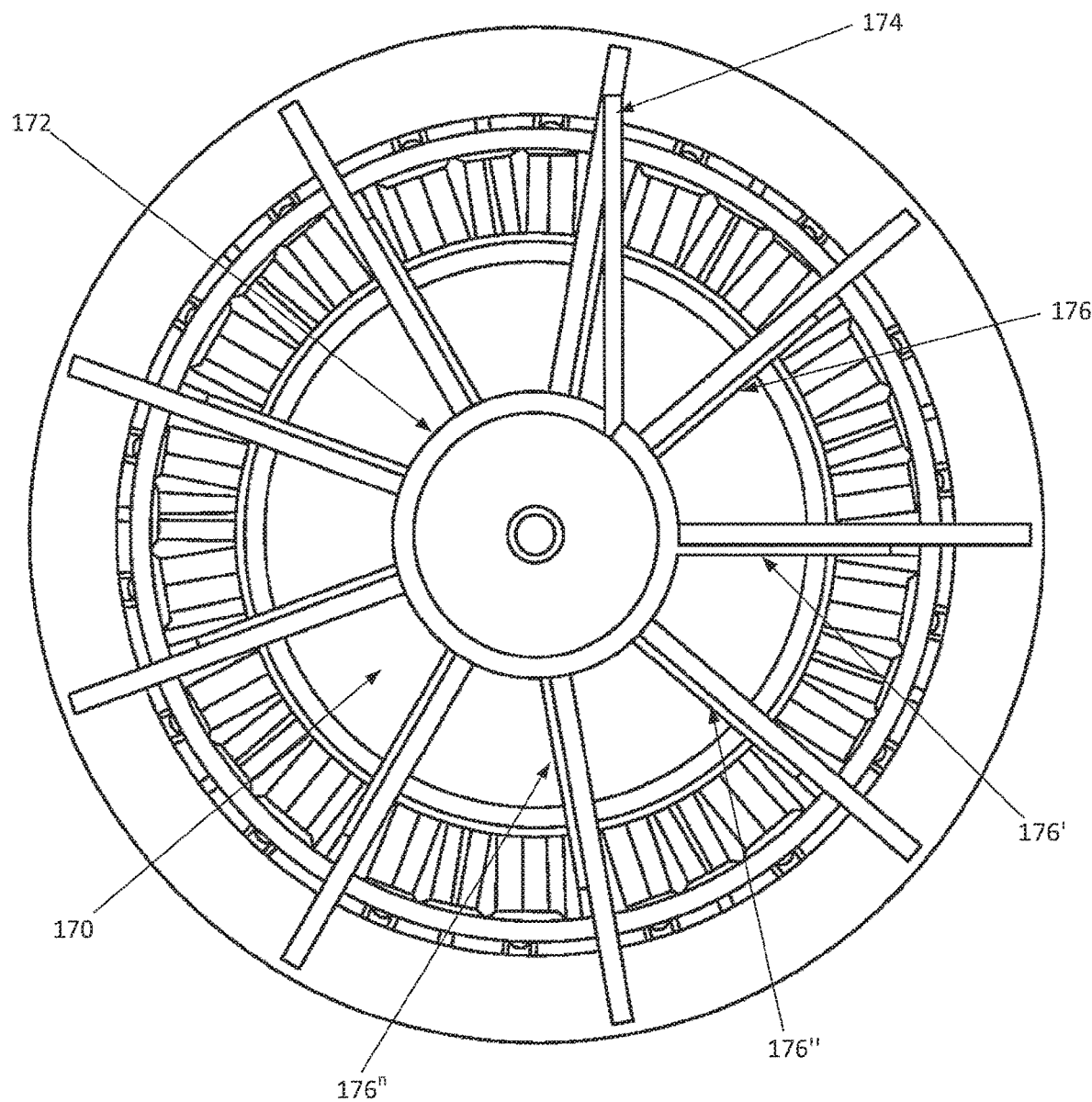
FIG. 2 is a top view illustration of the hydro-electric power system according to FIG. 1.

Turning to FIG. 2, a top view of the system 100 is depicted showing the fluid distribution system 170 which includes a central pipe 172 that is fed by a water source pipe 174 connected to a source of water (not shown). The central pipe 172 is provided having a circular shape and has a plurality of distribution pipes 176, 176', 176", 176‴ extending radially outward from central pipe 172. While nine distribution pipes are depicted extending outward from central pipe 172, it is contemplated that a fewer or greater number of distribution pipes 176, 176', 176", 176‴ could effectively be used. The use of multiple distribution pipes 176, 176', 176", 176‴ that are radially positioned about central pipe 172 is provided to more evenly water throughout tank 150 for distribution.

Figure 3:
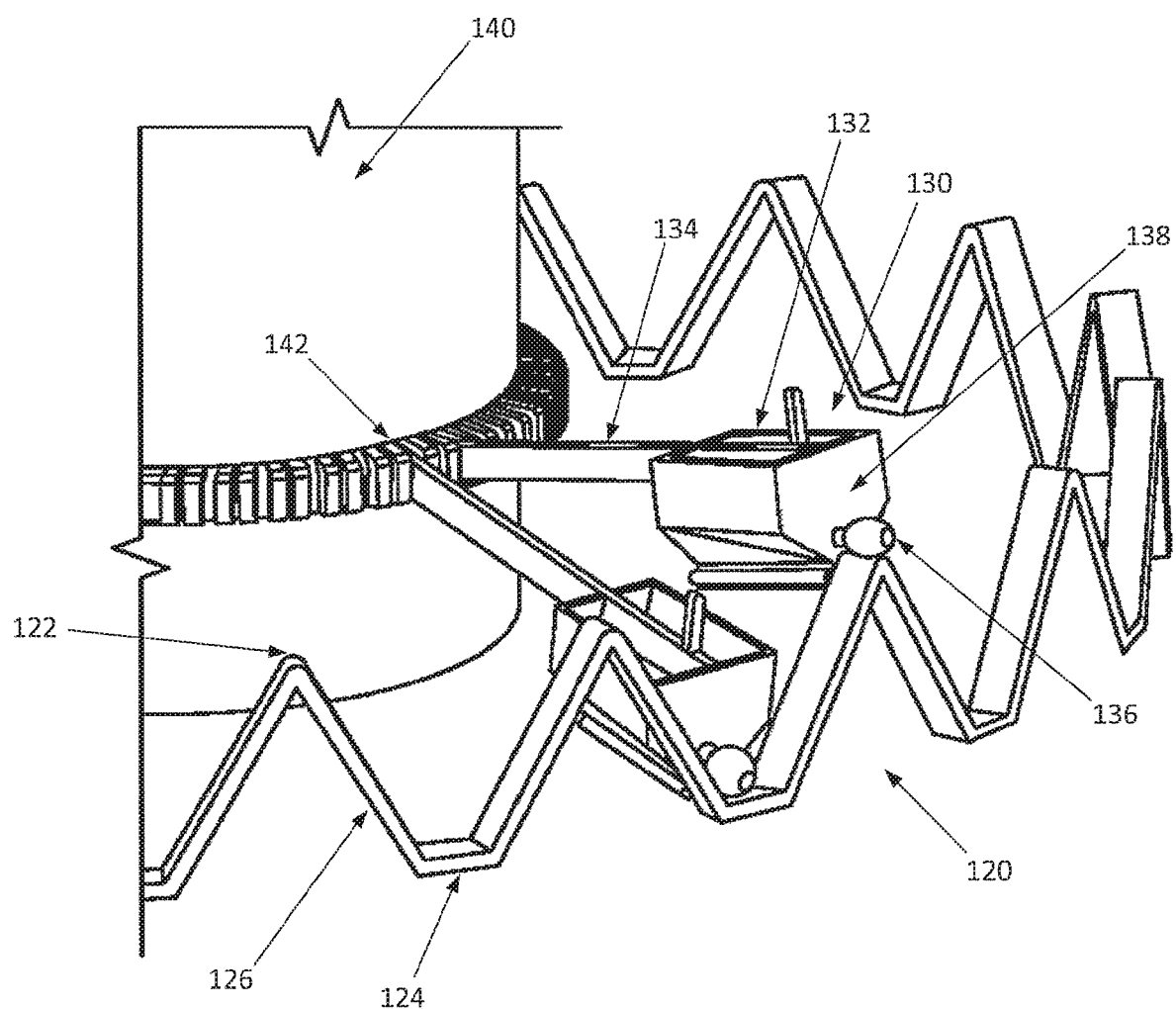
FIG. 3 is a perspective view illustration of the track, arms and containers according to FIG. 1.

FIG. 3 shows a more detailed view of the track 120 and the containers 130 as well as the hub 140. The track 120 is provided as a series of A-frames, which function to interact with the containers 130. The containers 130 comprise a bucket 132 that is provided to hold a fluid and an arm 134 that supports the bucket 132. The container includes a supporting mechanism 136 that is positioned on an end 138 of bucket 132. The supporting mechanism 136 may be formed as a wheel that contacts the track 120 and rolls along an upper surface.

The arm 134 is connected to the hub 140 by means of a hinge 142 that holds one end of the arm 134. The hinge 142 allows the arm 134 to move in a plane upward and downward, but prevents any lateral movement. Accordingly, when the track 120 rotates, the containers 130 will be maintained their radial position relative to the hub 140, but will be allowed to move upward and downward following the upper surface of the track 120.

The track is provided having a high point 122 and a low point 124 with a sloped section 126 connecting therebetween. The sloped section 126 is provided at an angle relative to a platform 110 on which the track 120 is positioned and is illustrated comprising a straight section of track. However, it is contemplated that a curved section could effectively be used to connect the high and low points 122, 124.

A protrusion 133 is provided in connection with container 130 that is designed to interact with the tank 150. For example, when a container 130 reaches a high point 122 of track 120 the protrusion 133 will contact a lever (not shown)

Figure 4:
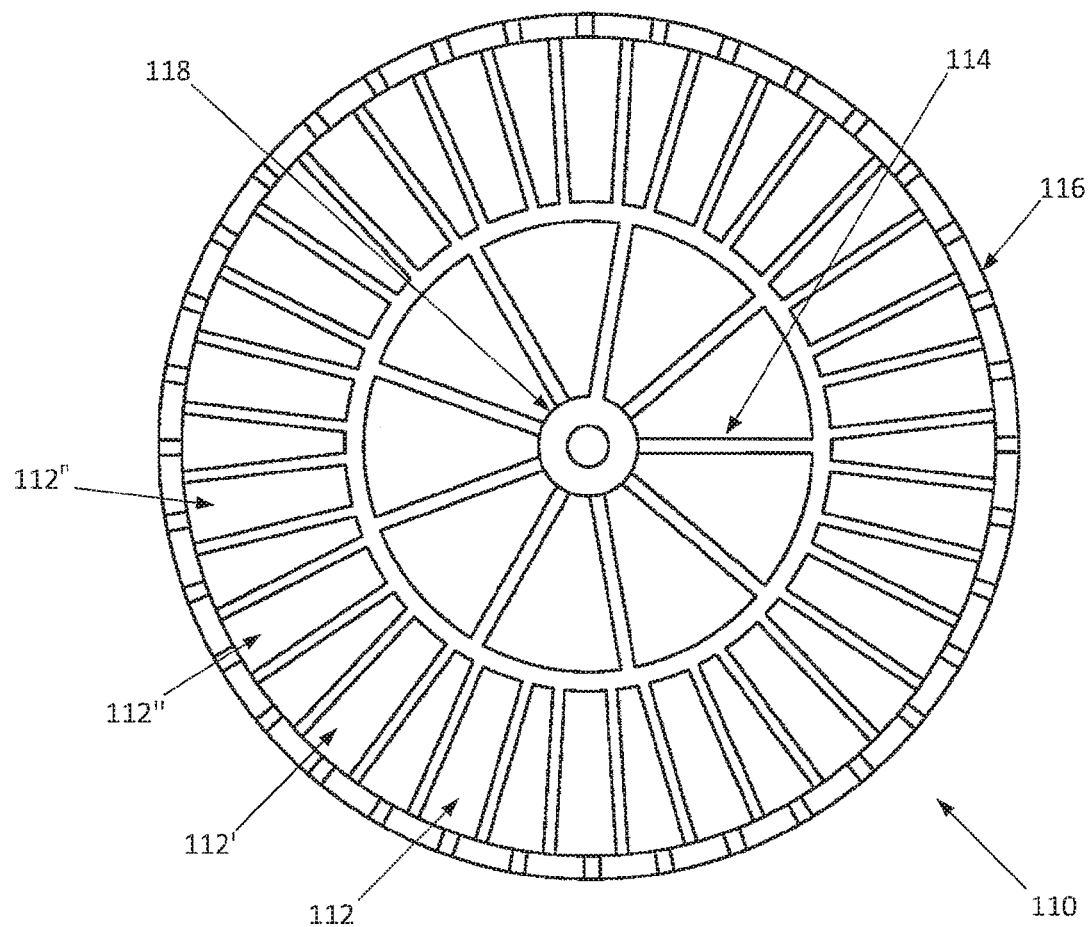
FIG. 4 is a top view illustration of the platform according to FIG. 1.
Figure 5:
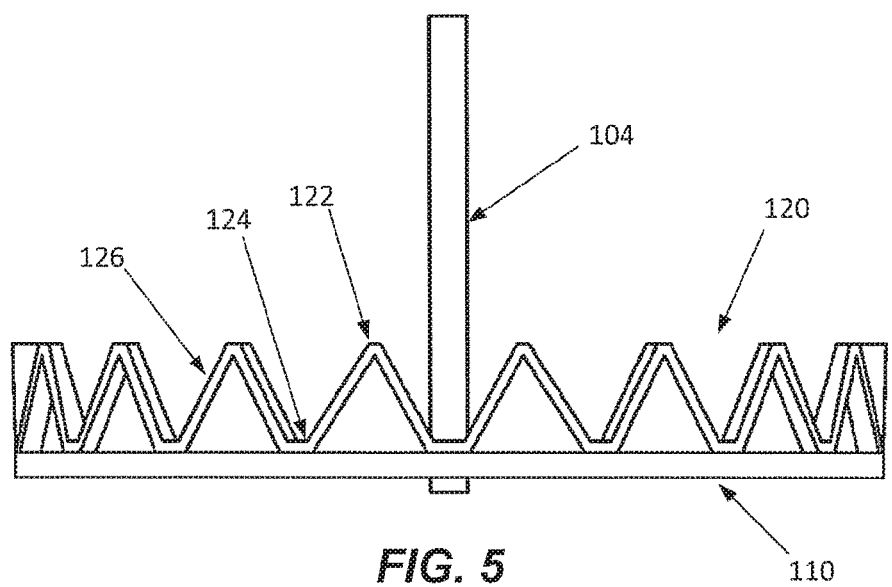
FIG. 5 is a side view illustration of the platform according to FIG. 4.

FIGS. 4 and 5 illustrate a depiction of the platform 110 that is provided to rotate relative to a central axis 104 to which the hub 140 is mounted (FIGS. 1 & 6). The central axis 104 is secured to base 102 as can be seen in FIG. 1. It is contemplated that the platform 110 may be provided with a bearing (not shown) that allows platform 110 to freely rotate about central axis 104 with little to no resistance.

The platform is provided as a disc-shaped device and includes a plurality of openings 112, 112', 112", 112‴ provided in an outer portion 116 of platform 110, which plurality of openings 112, 112', 112", 112‴ are provided to allow water to pass therethrough. The platform 110 may further be provided comprising a series of inner spokes 114 that connect the outer portion 116 of the platform to a center hub 118 in contact with the central axis 104. Again, while nine inner spokes 114 are depicted, it is contemplated that fewer or more spokes may effectively be used. It will be understood that the configuration of the spokes provides the advantage that the platform is formed of less material and is therefore lighter in weight than a solid platform and as such, the lighter weight allows for less resistance to rotation of the platform 110. Additionally, it is contemplated that the platform 110 could be formed of a composite or alloy to provide a light-weight, yet strong structure. The track 120 could also comprise a composite or alloy material and could be bonded to an outer perimeter of the platform 110 via welding or other method.

Figure 7:
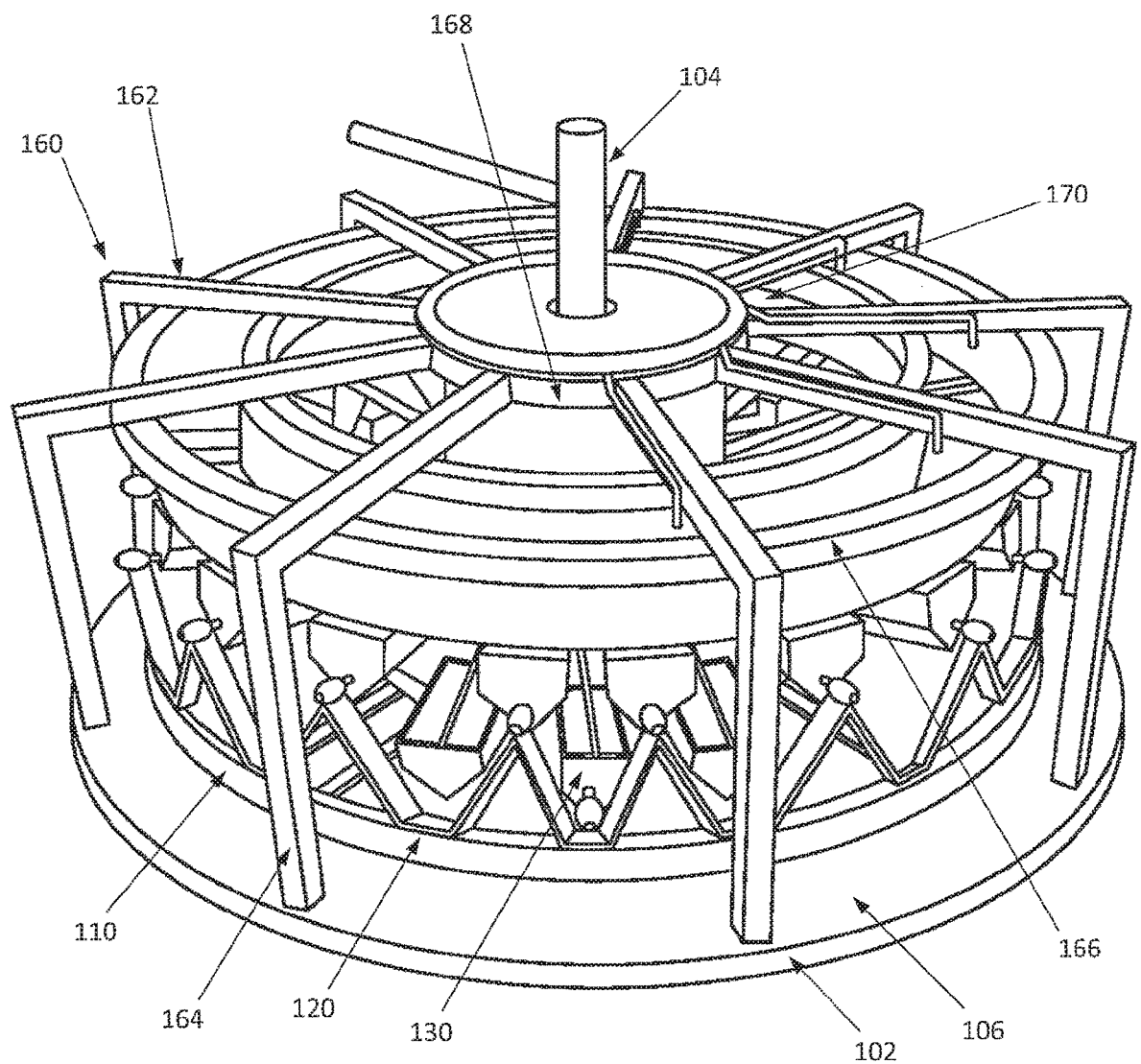
FIG. 7 is a perspective view illustration of the hydro-electric power system according to FIG. 1.
Figure 12:
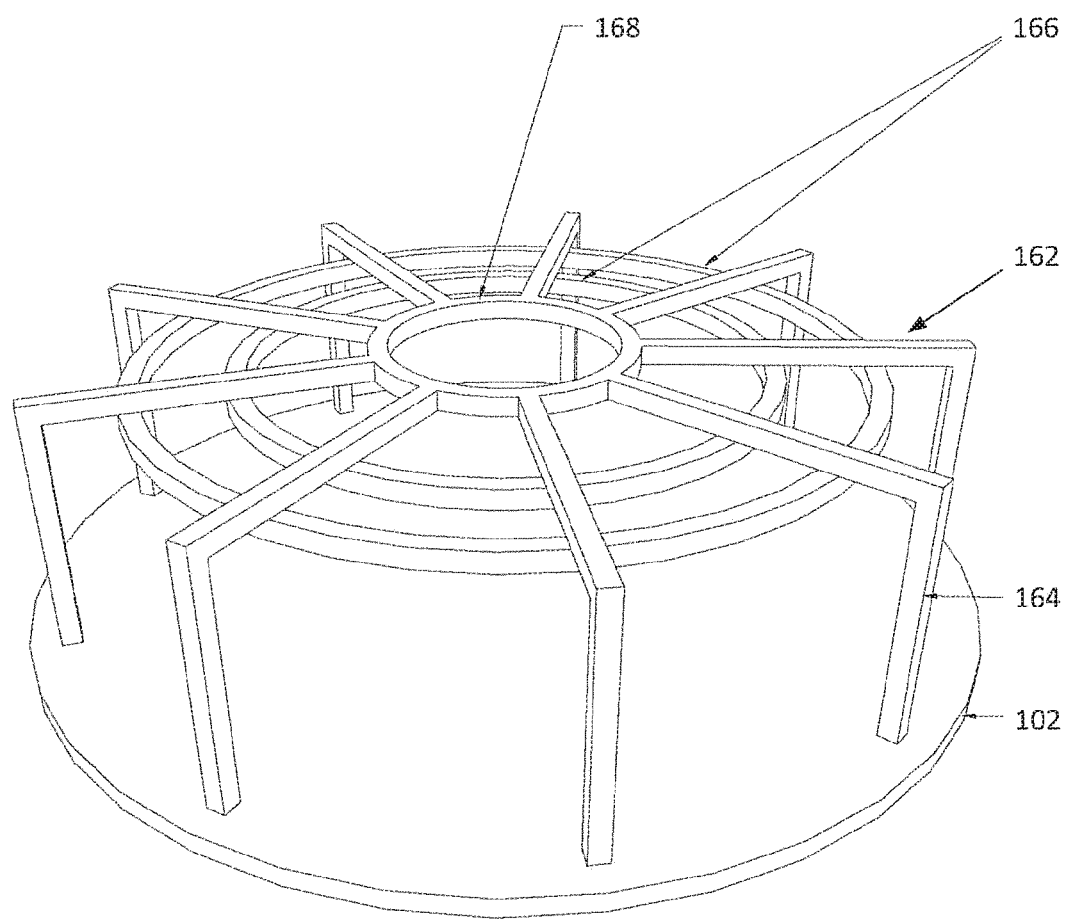
FIG. 12 is a perspective view illustration of the supporting structure and base according to FIG. 9.

FIG. 7 is a perspective view of the hydro-electric power system 100 showing the top of the device. In particular, a view of the supporting structure 160 is provided in detail in FIG. 12 including a horizontal beam 162 having a proximal end extending radially outward from a center ring 168. The horizontal beam 162 has a distal end that is connected to and supported by a corresponding vertical beam 164. Concentric supports 166 connected to an underside of the horizontal beam 162 and provides support tank 150. As can be seen in FIG. 7, there are nine horizontal beams 162 and nine corresponding vertical beams 164 extending radially from center ring 168. One of skill in the art however, will understand that a fewer or greater number of beams may be used as desired and depending on the amount of weight that must be supported by the supporting structure 160. Additionally, it is understood that each horizontal beam 162 may be connected to the center ring 168 and corresponding vertical beam 164 by any suitable means including, for example but not limited to, a welded connection or a bolted connection. Additionally, the concentric supports 166 could also be connected to the horizontal beams 162 in a similar fashion, (e.g., welded connection, bolted connection, or fastener and hanger arraignment, etc.).

The supporting structure 160 sits on an upper surface 106 of base 102 and could be affixed by any suitable means whether detachable or permanently affixed including, but not limited to: bolting, clamping, welding, friction fitted, slot and groove connection, and so on. Likewise, the individual horizontal beams 162 and individual vertical beams 164 could be detachably connectable to each other and to the center ring 168 and concentric support 166 allowing for partial disassembly for repair and or replacement of portions of the system 100.

Figure 8:
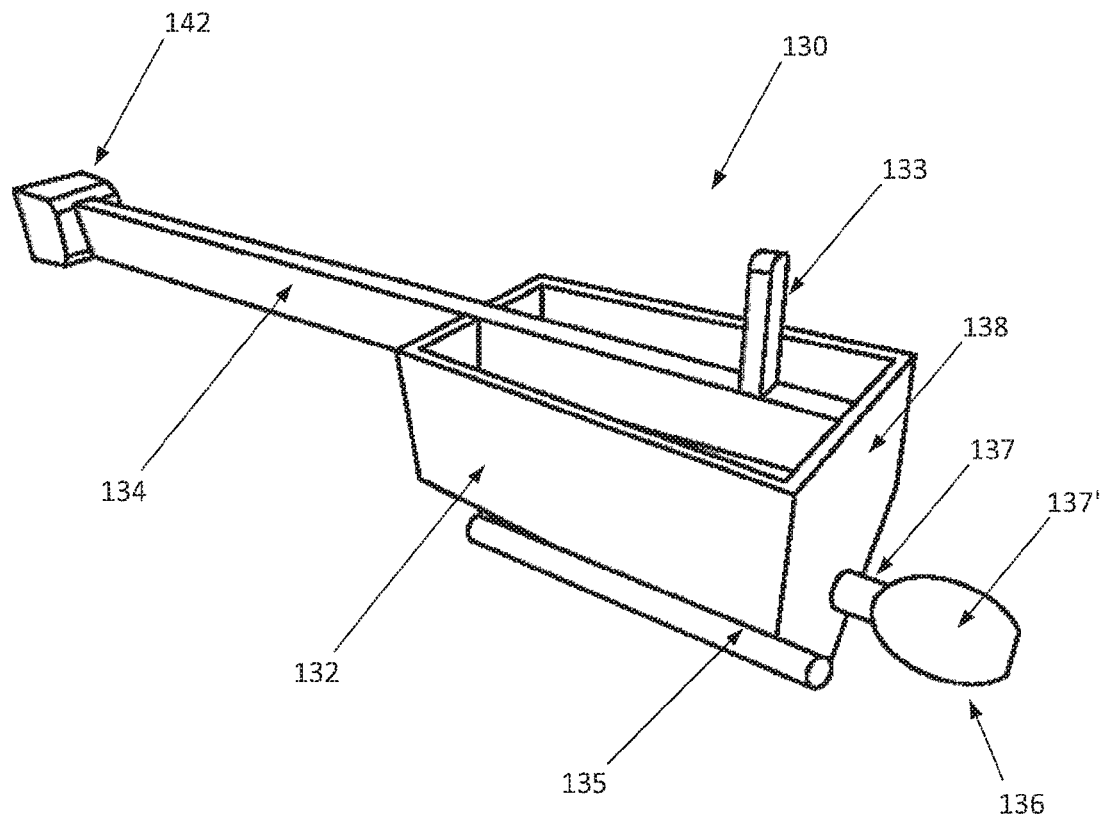
FIG. 8 is a perspective view illustration of an arm and container according to FIG. 1.

FIG. 8 shows the container 130 is greater detail. In particular, the supporting mechanism 136 is formed having a shaft 137 and a roller 137' that is adapted to rotate around the shaft 137. The roller 137' could comprise a plastic or nylon material and be provided with an internal bearing to reduce or virtually eliminate friction. While the supporting mechanism 136 is shown extending from an end 138 of bucket 132, it is conceived that the shaft 137 and roller 137' could be provided on the opposite end of bucket 132 or even in conjunction with arm 134. For example, the track 120 could be positioned radially inward (closer toward hub 140) relative to bucket 132 rather than being positioned radially outward relative to bucket 132.

Also shown in FIG. 8 is a latch 135' that is provided for opening a door 135 (FIG. 19) on an underside of bucket 132 such that when the bucket 132 advances downward to reach low point 124, the latch 135' may interact with the platform 110 to open the bottom door of bucket 132 allowing the water to be released and pass down through the platform 110. Likewise, once the bucket 130 reaches high point 122, the protrusion 133 interacts with tank 150 allowing water in the tank to drop downward into the bucket 132. The weight of the water in the bucket 132 will cause the filled bucket to be pulled downward such that roller 137' will travel down the sloped section 126 extending from high point 122 to low point 124. The hinge 142 will resist any lateral movement of arm 134, however the weight interacting with the sloped section 126 will exert a rotational force onto platform 110 to which track 120 is affixed. This downward force will cause platform 110 to rotate. The empty bucket 132 will not exert as strong a force as the downward traveling filled bucket as the water in the bucket at the low point will have been released. The result is that the rotational force exerted by the downward traveling bucket will overcome the upward force needed to move the adjacent bucket to a high point. The additive nature of the filled buckets acting in unison will provide a very strong rotational force and as long as the water source remains, the device can continually turn, which rotation can be converted into electrical energy via a generation device as is known in the art.

Figure 9:
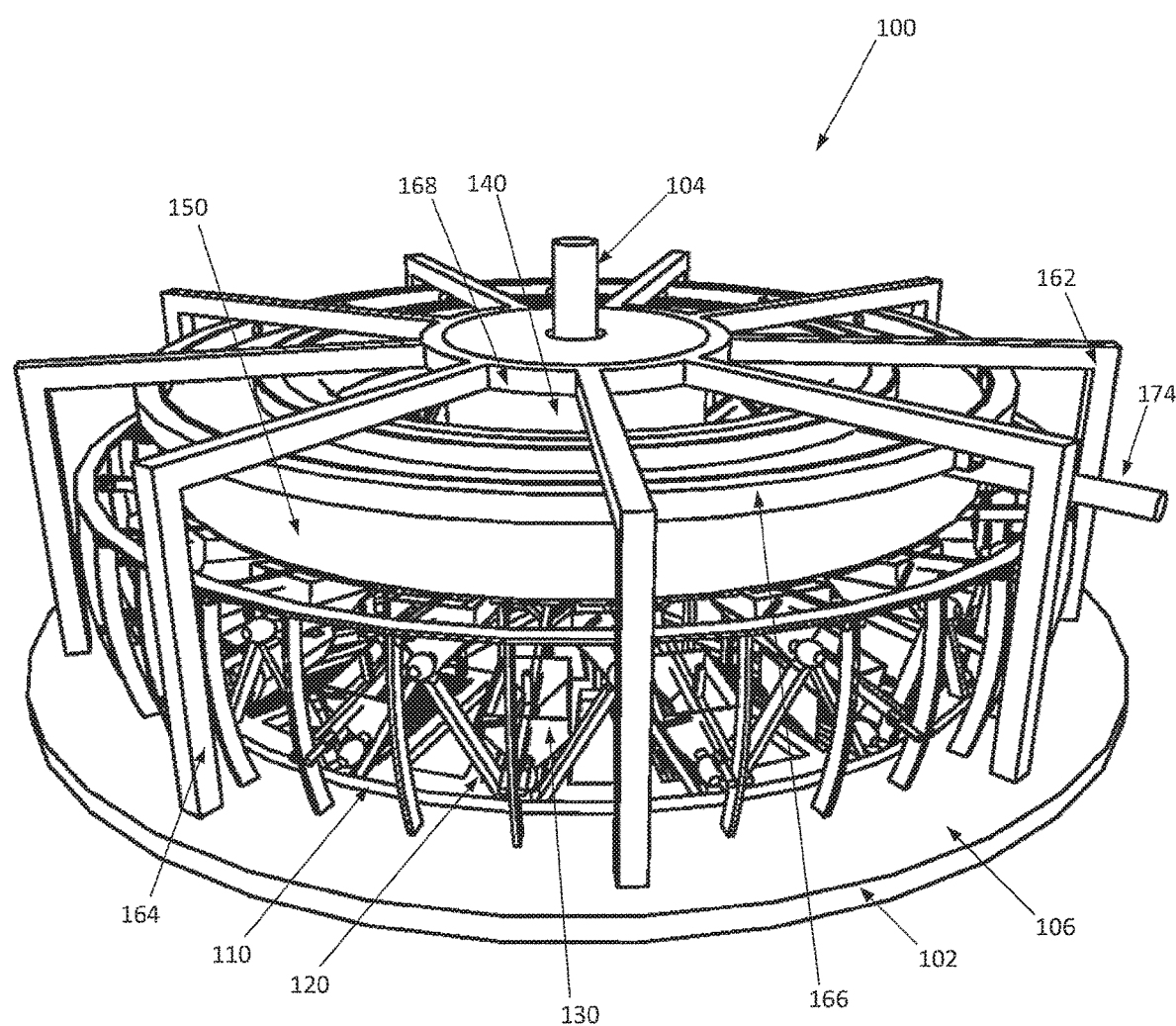
FIG. 9 is a modified perspective view illustration of the hydro-electric power system according to FIG. 1.
Figure 10:
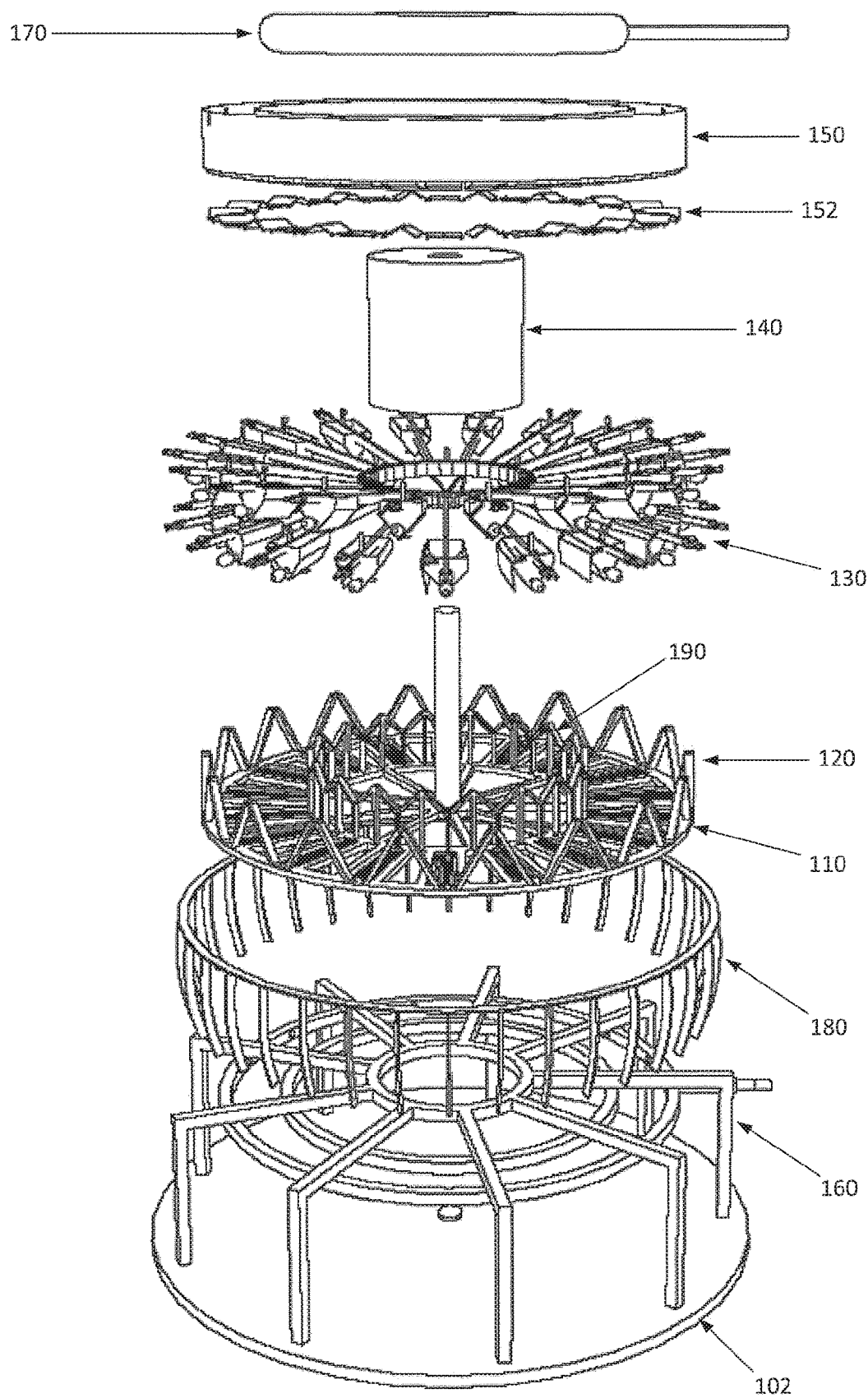
FIG. 10 is an exploded perspective view illustration of the hydro-electric power system according to FIG. 9.

Turning now to FIG. 9 an alternative configuration of hydro-electric power system 100 is illustrated. The system is similar to that depicted in FIG. 7 with a number of modifications. In particular, reference to FIG. 10 shows an exploded view of system 100, which includes many of the elements corresponding to FIG. 6 and in particular, a platform 110, a track 120, a plurality of containers 130, a stationary hub 140, a tank 150 including a series of doors 152, a supporting structure 160 and a distribution system 170.

In addition to the above-listed elements, additional elements are shown including, a plurality of guide rails 180 and an inner track 190. Additionally, the distribution system 170 is illustrated as a donut-shaped system and seen more clearly in FIG. 22. Each of these systems will be discussed in connection with the following drawings illustrating the subsystems in more detail.

Figure 11:
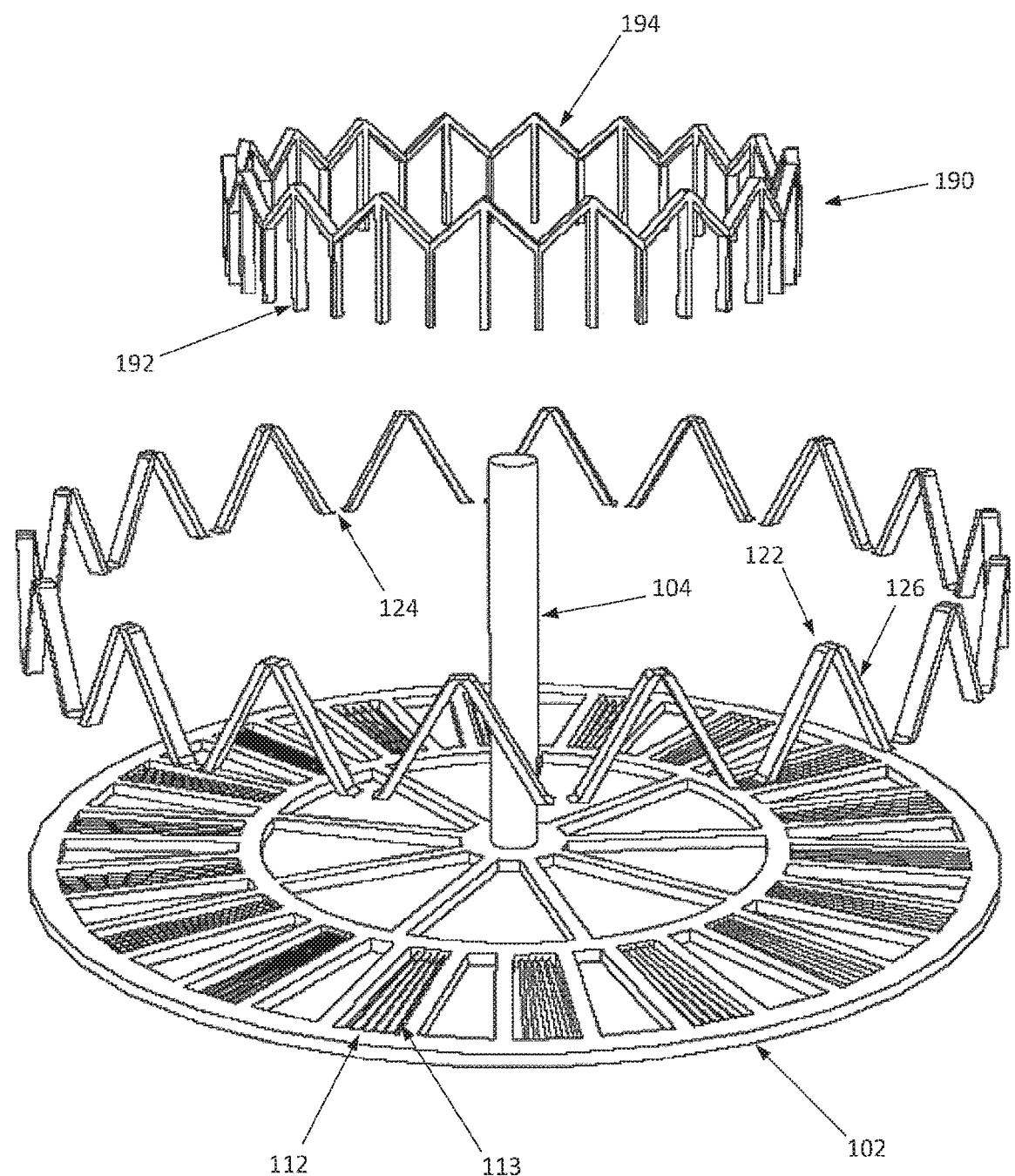
FIG. 11 is an exploded perspective view illustration of the platform and tracks according to FIG. 9.

FIG. 11 shows platform 110 including track 120 having high points 122 and low points 124 with sloped section 126 extending therebetween. It will be noticed in the configuration shown in FIG. 11 that high points 122 are provided as flat sections for a length. This allows for the filling of the buckets 132 while the wheel 137' travels along the high point 122 prior to beginning to transition to low point 124 via sloped section 126.

Also shown in FIG. 11 are a plurality of openings 112, 112', 112", 112'" each having a series of slanted blades 113 through which water will pass upon release from the bucket 132. When water released from the bucket 132 passes through slanted blades 113, the weight of the falling water will act on the slanted blades 113 and have the effect of exerting a lateral force on the slanted blades 113. This lateral force will function to add to the rotation of platform 110.

Also shown in FIG. 11 is inner track 190, which is provided attached to platform 110 and is positioned radially outward from inner spokes 114. The inner track 190 is adapted to interact with arm 134 as can be better seen in FIG. 17. In one configuration, the underside of arm 134 and the upper surface 191 (FIG. 18) of track 190 may be provided with/as a material that will reduce friction (e.g., application of a lubricant(s), use of polymer material, such as, polytetrafluoroethene (PTFE) or perfluoroalkoxy polymer resin (PFA) or similar friction-reducing materials) between arm 134 and the surface of track 190.

The inner track 190 comprises a series of vertical supports 192 along with a series of angled members 194 that extend between the vertical supports 192. In one configuration, the vertical supports 192 are configured alternately as longer support members and shorter support members and generally designed to allow for support of arm 134 as the containers 130 travel upward and downward based on track 120.

Figure 13:
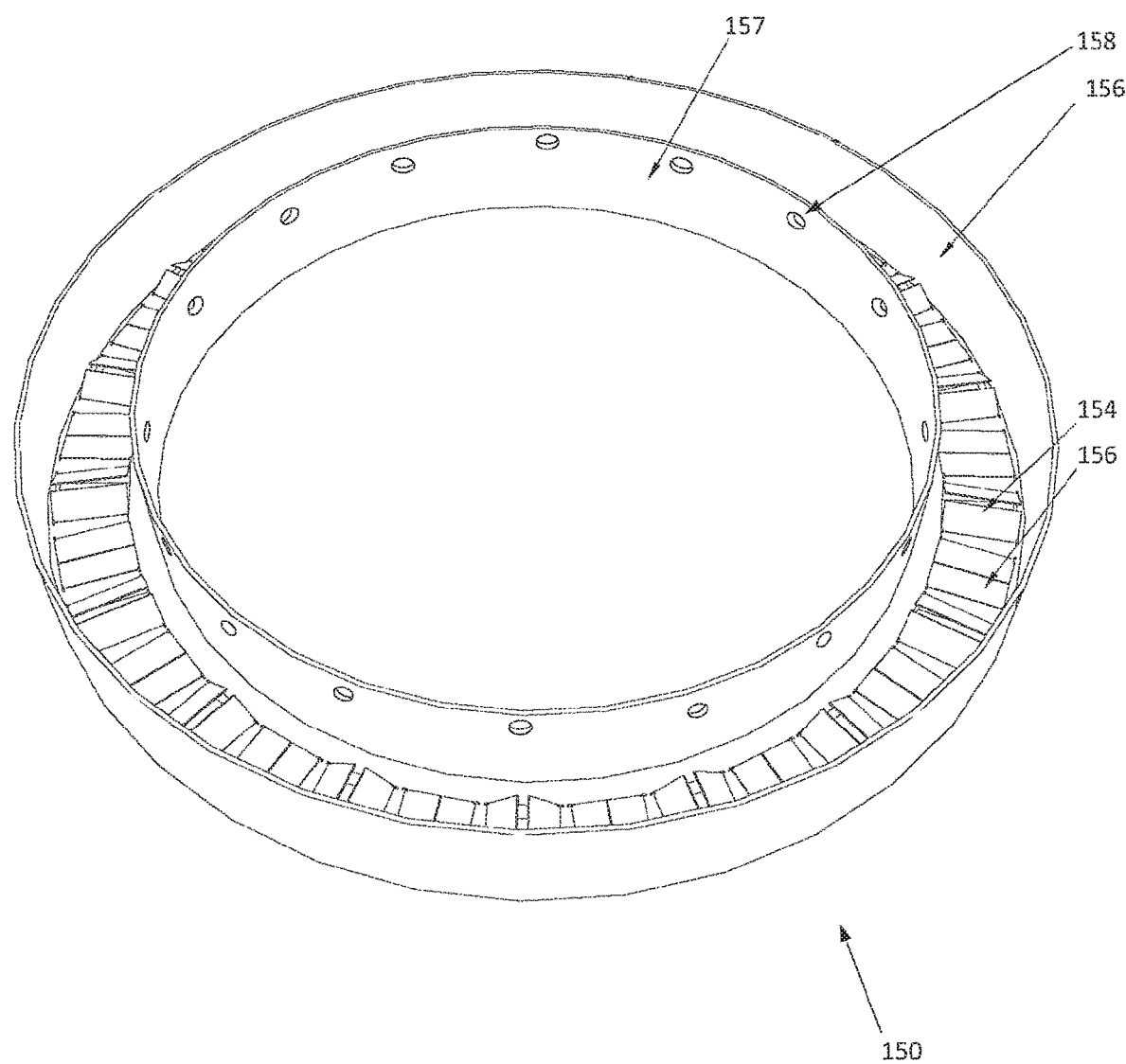
FIG. 13 is a perspective view illustration of the concentric tank according to FIG. 9.

FIG. 13 is an alternative configuration of tank 150, which comprises a concentric-shaped tank including an inner wall 157 and an outer wall 156. A series of doors 152 (also seen in FIG. 15) are spaced along a floor of the tank 150. The series of doors 152 are spaced allowing for the placement and adjustment of the containers 130 about the exterior of hub 140. In this configuration, each of the series of doors 152 comprise a pair of doors where a first pair of doors 154 are positioned to open and close depending on a position of the containers 130, and a second pair of doors 156 that are positioned such that they will remain closed. The doors above the tubs could be provided to pivot about 2 inches off center to effect a faster open/close function. Additionally, the heavy side of the door in addition to water weight will function to cause the doors to close.

Inner wall 157 is provided having a series of radially offset openings 158 spaced apart from each other. The openings 158 are generally spaced around the inner wall 157 allowing for a pipe to pass therethrough to let water (or other fluid) pass into the tank to be allowed to flow downward through the first pair of doors 154 when they open corresponding to when a bucket 132 is positioned below the corresponding first pair of doors 154 when running along a corresponding high point 122 of track 120.

Figure 14:
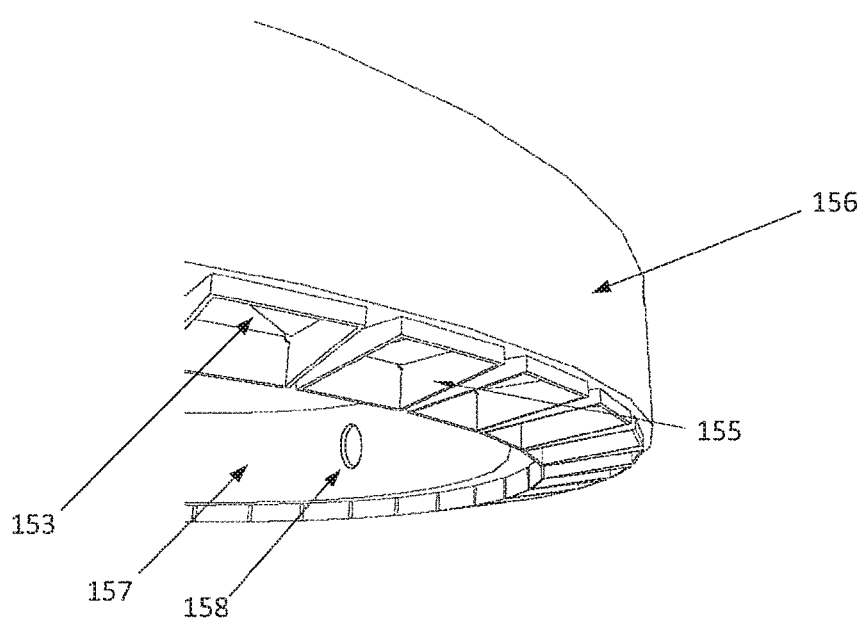
FIG. 14 is a detail view of a portion of the concentric tank viewed from below according to FIG. 13.
Figure 15:
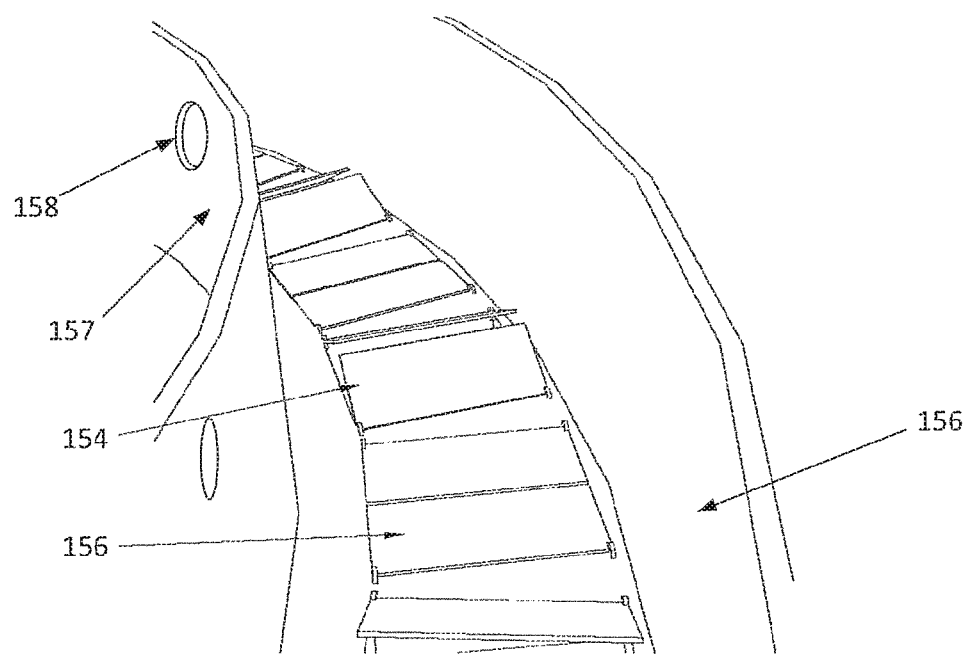
FIG. 15 is a detail view of a portion of the concentric tank viewed from above according to FIG. 13.

Alternate views of the series of doors 152 can be seen in FIGS. 14 and 15, which alternately show a portion of tank 150 from below (FIG. 14) and above (FIG. 15).

FIG. 14 illustrates openings 153 corresponding to each of the series of doors 152. Additionally, walls 155 extend downward from the bottom of tank 150 and frame each of the openings 153 and function to direct the water passing through the opening 153 straight downward and into the top of a bucket 134 that will be aligned with the opening 153. In one configuration, the walls 155 toward the inner wall 157 extend downward a greater distance than the walls 155 toward the outer wall 156, however, it is conceived than a number of different configurations are possible.

Figure 16:
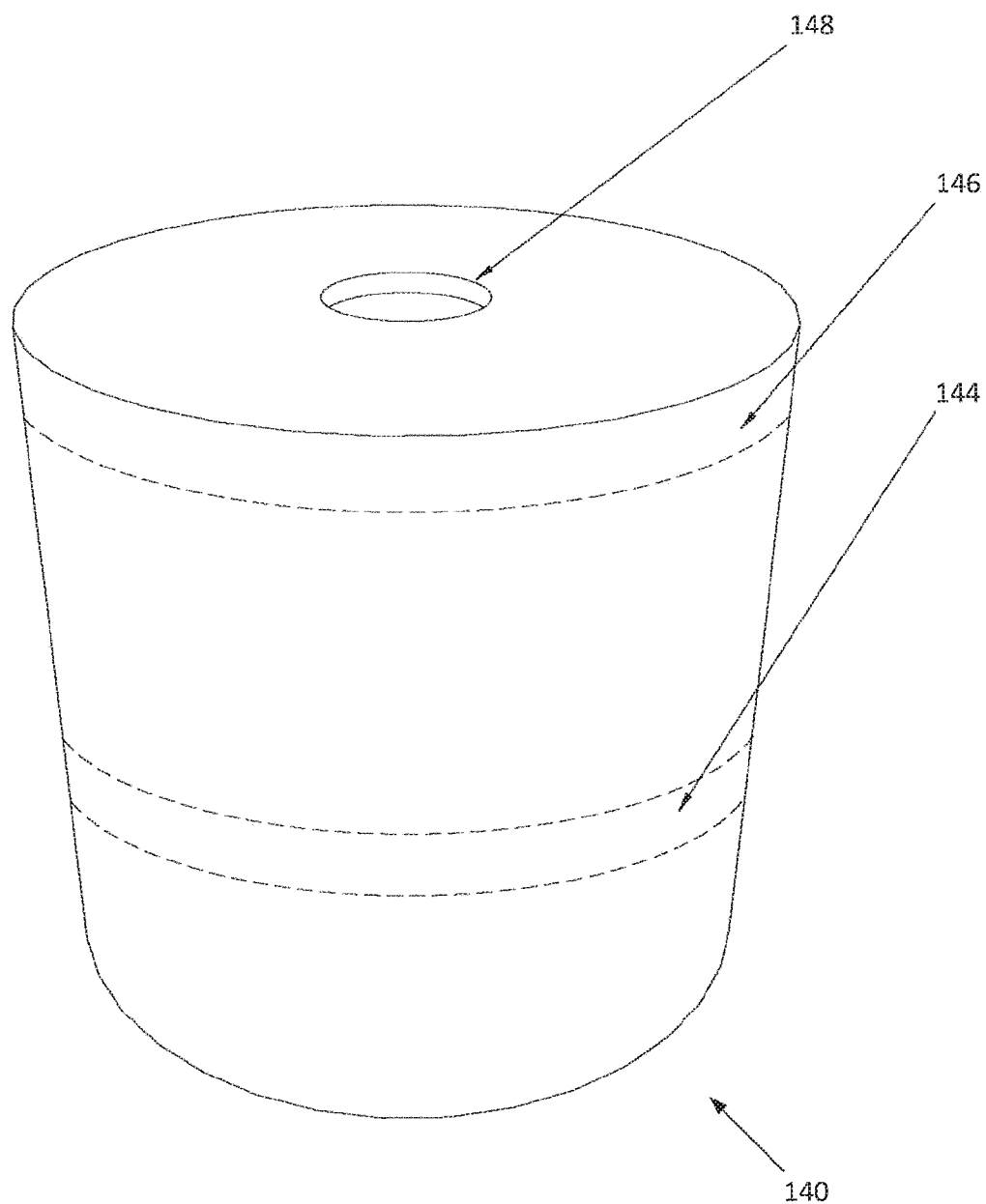
FIG. 16 is a perspective view illustration of the hub according to FIG. 9.
Figure 17:
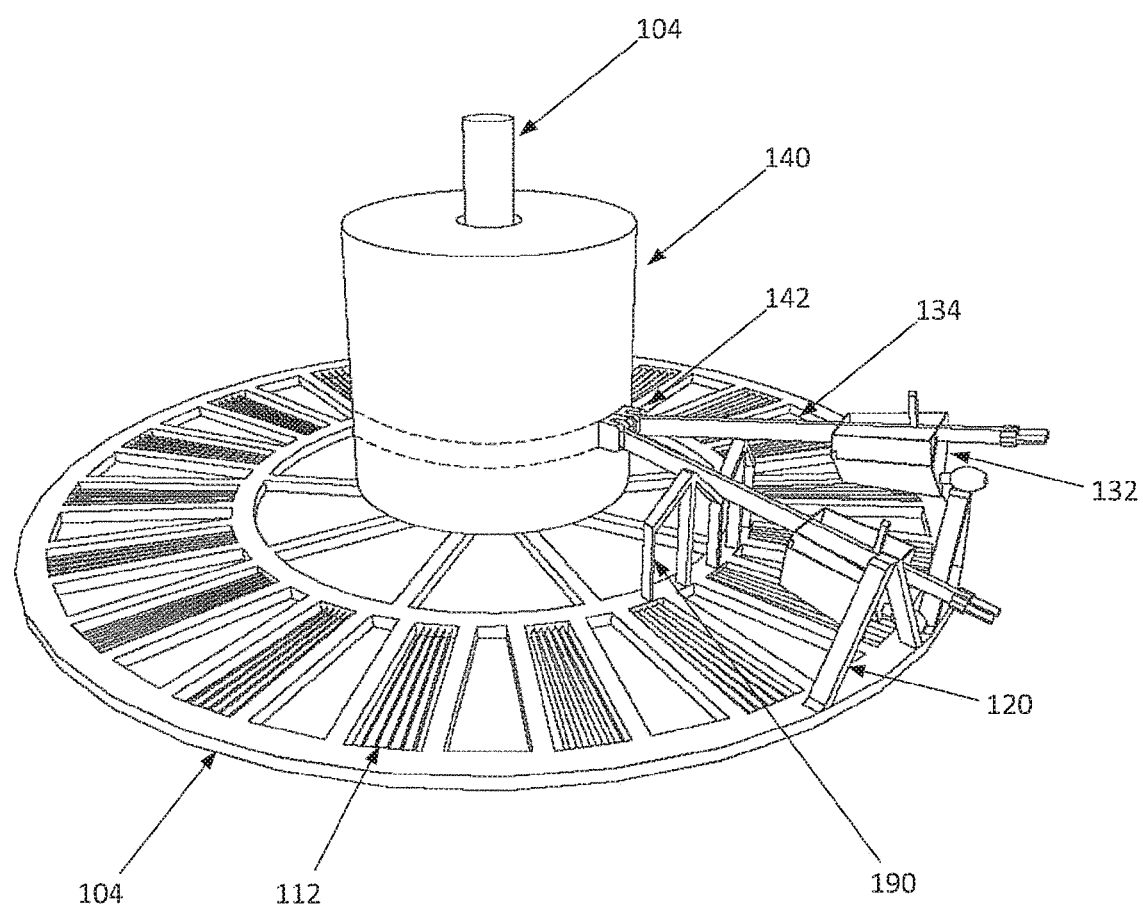
FIG. 17 is a perspective view illustration of the hub, the platform, a portion of the outer track and inner track and two arms with containers according to FIG. 9.

FIG. 16 illustrates one configuration of the hub 140, which is provided as a generally cylindrically shaped member. Hinges 142 (FIGS. 17 and 18) may be arranged around an exterior surface of hub 140 at perimeter 144. Additionally, center ring 168 may be affixed around an exterior surface of hub 140 at perimeter 146. Finally, a hole 148 is provided in an upper surface 149 of hub 140, which allows shaft 104 to pass therethrough, which is illustrated in FIG. 17.

Figure 18:
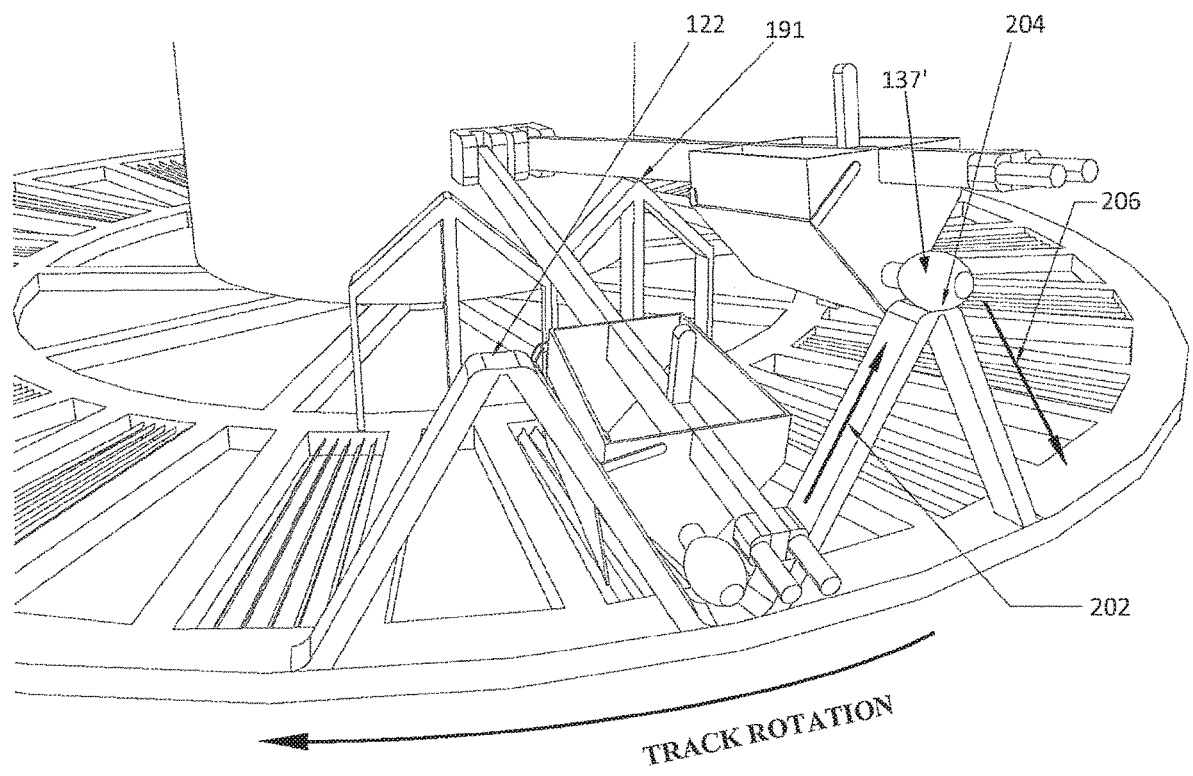
FIG. 18 is a perspective view illustration of a portion of the hub, the platform, the outer track and inner track and two arms with containers according to FIG. 17 and illustrating the movement of the platform and the containers.
Figure 20:
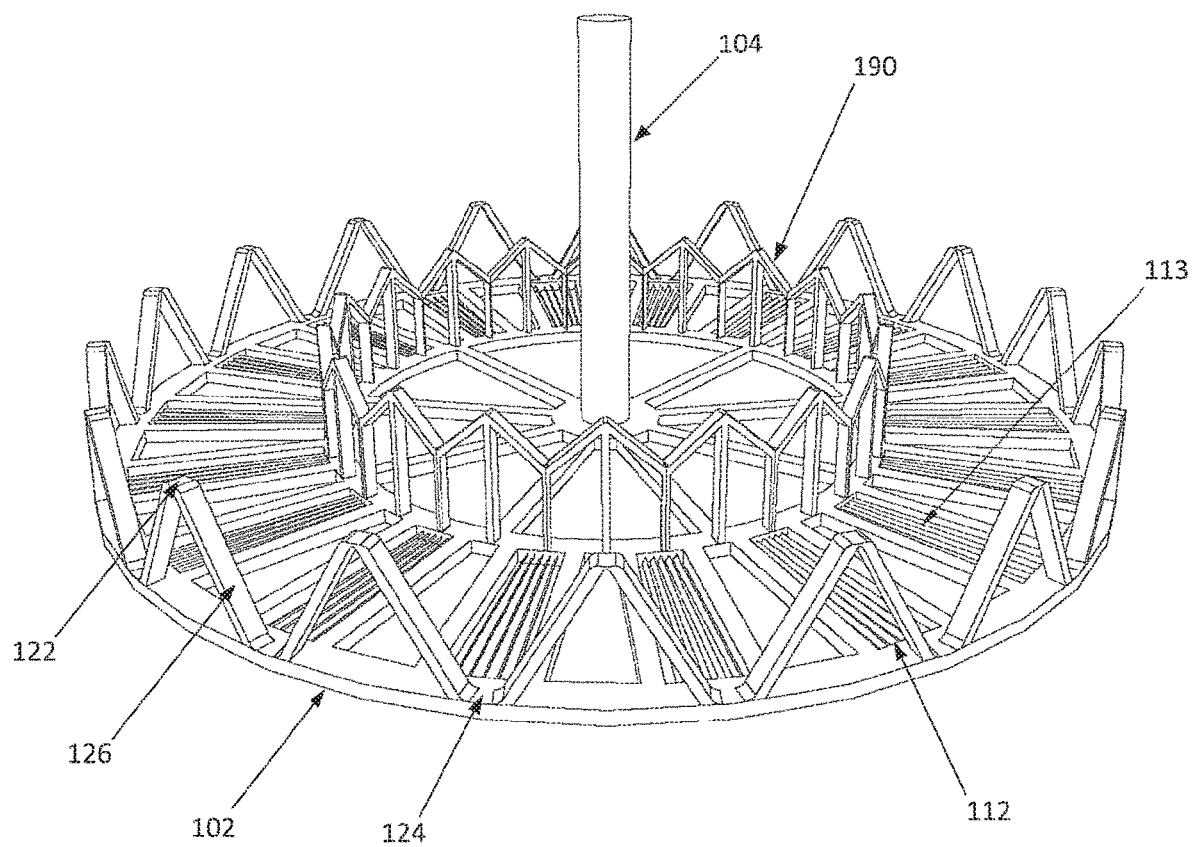
FIG. 20 is a perspective view illustration of the hub, the platform, the outer track and the inner track according to FIG. 9.

FIGS. 18 and 20 illustrate the movement of the platform 110 and subsequent rotation of track 120 and the interaction with containers 130. In this illustration, the platform 110 is rotating clockwise as indicated by the arrow labeled "TRACK ROTATION" (FIG. 18). Also shown in FIG. 18 is an upward extending arrow 202 as well as a downward extending arrow 206. These arrows are provided to indicate the path of travel of bucket 132 as roller 137' travels along track 120. Also shown is position 204 that generally corresponds to high point 122 of track 120.

Figure 19:
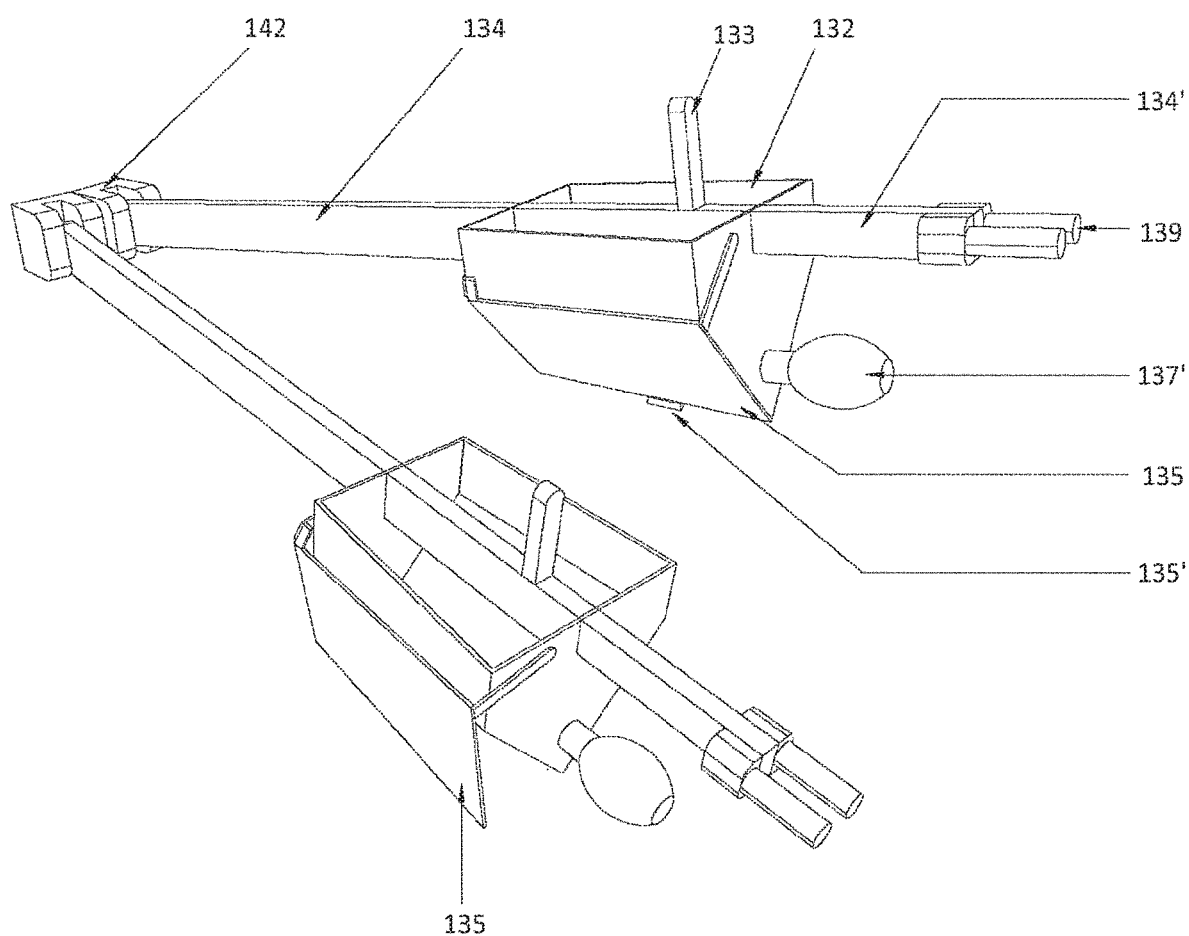
FIG. 19 a detail view of the two arms with containers according to FIG. 17.

FIG. 19 depicts the containers 130 in greater detail in the positions illustrated in FIG. 18. In the positions indicated with one container 130 correspond to low point 124 and the other container 130 corresponds to high point 122. In this configuration, arm 134 extends beyond the end of bucket 134 forming extension 134' and ending with a forked end 139. Door 135 is provided having a latch 135' released by contacting a member on the rotating platform 110.

Figure 21:
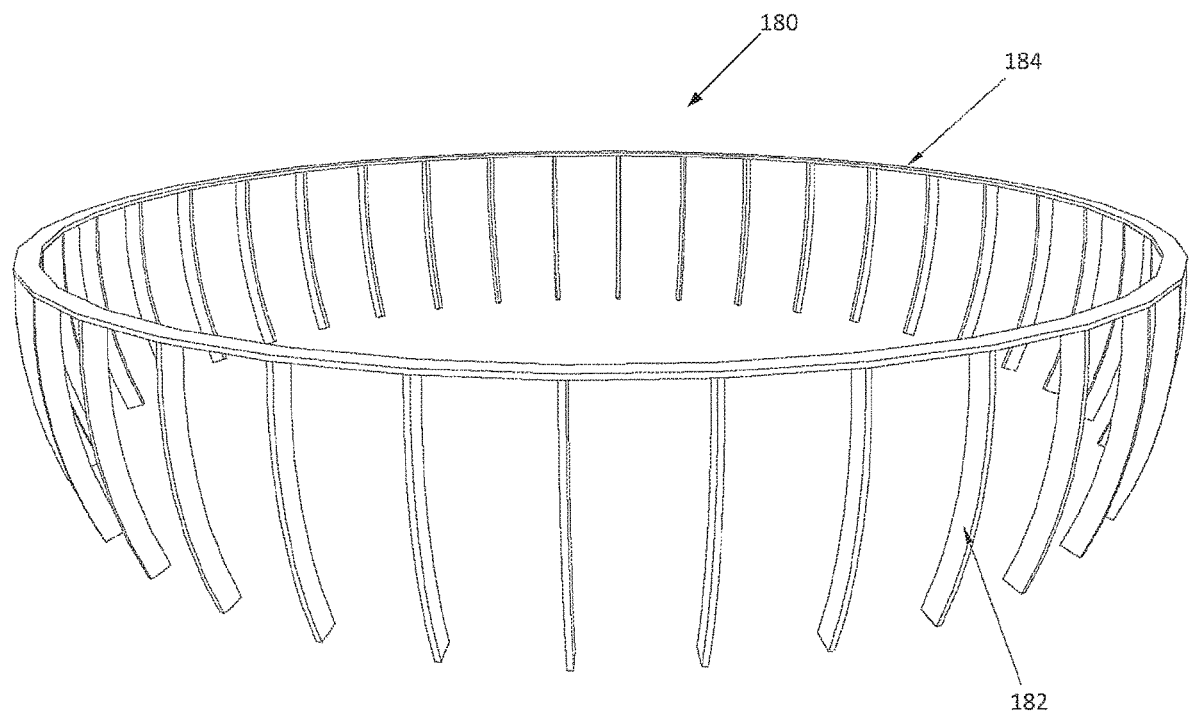
FIG. 21 is a perspective view illustration of the guide rails according to FIG. 9.

FIG. 21 illustrates the plurality of guide rails 180. The plurality of guide rails 180 comprise upstanding rails 182 as well as the upper circular support member 184 to which the upstanding rails 182 are attached. The plurality of guide rails 180 can be provided in one configuration as a stand-alone structure. In one configuration, the lower ends 186 of the upstanding rails 182 could be affixed to base 102. For example, base 102 could be provided with a plurality of cavities into which the corresponding lower ends 186 of the upstanding rails 182 could be inserted. This interaction of the ends 186 with the plurality of cavities would function to resist any rotation of the plurality of guide rails 180.

Figure 22:
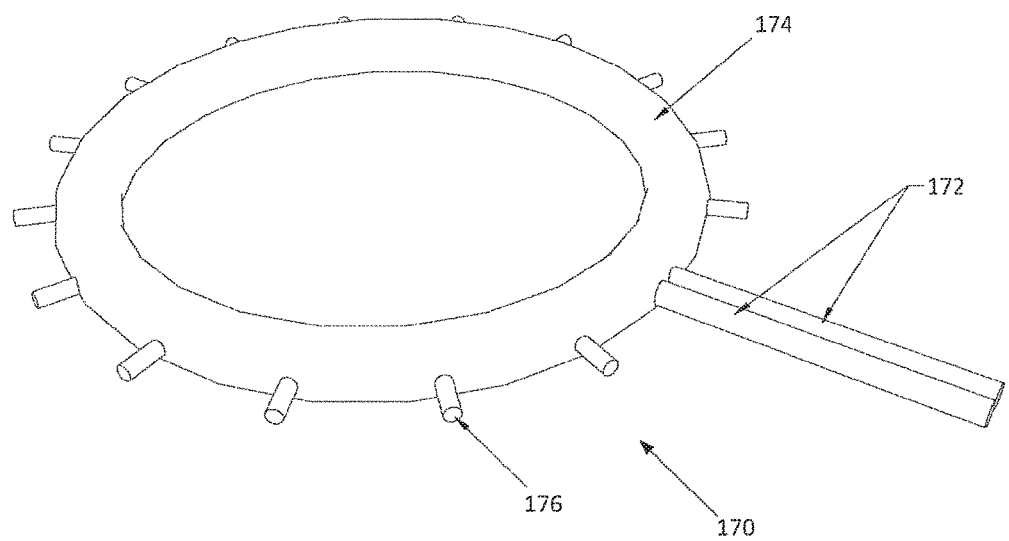
FIG. 22 is a perspective view illustration of the filling apparatus for the tank according to FIG. 9.

FIG. 22 depicts distribution system 170 that includes main water supply pipe 172, which may comprise one or more pipes. In FIG. 22, two supply pipes are depicted, however, it will be understood by those of skill in the art that only one pipe may be used, or a plurality (e.g., three or more) supply pipes may be used and spaced radially relative to each other. The supply pipe 172 feeds into a concentric distribution tube 174 that is designed to be mounted interior to concentric tank 150. Distribution pipes 176 are positioned radially offset from each other around an exterior of concentric distribution tube 174 and are designed to pass through openings 158 to allow water to be relatively evenly distributed in concentric tank 150.

Sequence of operation. The platform 110 having the track 120 mounted thereon is designed to rotate relative to the base 102 and hub 140. Water is introduced into the supply pipe 172 from a water source such as an uphill stream. The water passes through the supply pipe 172 into the concentric distribution tube 174 and passes through the individual distribution pipes 176 to be deposited into concentric tank 150.

The series of doors 152 are opened when a container 130 including a bucket 132 having a protursion 133 comes in contact with a tab on a first pair of doors 154 causing the doors to open allowing the water to pass from the concentric tank 150 to the bucket 132. The increased weight caused by the transfer of water to the bucket 132 will cause the bucket 132 to move downward along the track 120. As the bucket 132 is prevented from rotating, this will cause the platform 110 to rotate as the bucket 132 moves downward. Corresponding adjacent buckets will move upward as the water that was contained in the adjacent buckets will have been released at due to the interaction of a latch 135' on the bottom of door 132 of bucket 132 with the platform 110. The weight of the buckets containing the water will overcome the weight of the empty buckets and cause rotation of the platform. The rotational force is transmitted to the shaft 104 that can be coupled to power generation equipment as is known in the art for generating electricity.

The water falling out through the door 135 of bucket 132 will pass through the opening 112 in platform 110 and pass through blades 113. The angled nature of blades 113 will provide additive force to the rotation of platform 110.

As there will be an angular force that is applied to the individual containers 130, it is understood that the forked end 139 of extension 134' will interact with a corresponding upstanding rails 182 such that the upstanding rails 182 is positioned within the forked end 139. This will function to provide lateral support to each arm 134 allowing for free movement of the arm 134 and corresponding bucket 132 upward and downward based on hinge 142, but will resist any lateral movement of the arm 134. It should be noted that a friction reducing substance can be used to greatly reduce any friction caused between the interior of the forked end 139 and the corresponding upstanding rail 182 including any of the methods for reduction previously discussed herein.

Initial testing of the device showed that with a ten (10) foot arm with the A-frame and placing one (1) gallon of water in the bucket, a measurement of 110 ft/lbs of torque was generated. With eighteen individual buckets each filled to one gallon, this generates 1,980 ft/lbs of torque. It is generally understood that each bucket could contain from three (3) to as much as ten (10) gallons of water. The total amount of torque would depend on the amount of water transferred to each bucket. But as can be seen, the total amount of torque provided by the device can be greatly enhanced. It is further understood that the speed of the rotation can be controlled by a governor as is well-known in the art. Controlling the speed of rotation will be a factor in determining the amount of water transferred for each down stroke. Likewise, the speed of rotation can be selected based on the size of the device and the amount of power generation desired.

While a particular configuration has been shown including the number of various components, it should be understood that fewer or greater numbers of components can be utilized depending on the desired amount of power generation and the desired size of the device as well as the amount of water that is available to feed into the device. All of these factors can be taken into consideration in adjusting the size and power output desired without deviating from the invention.

Figure 23:
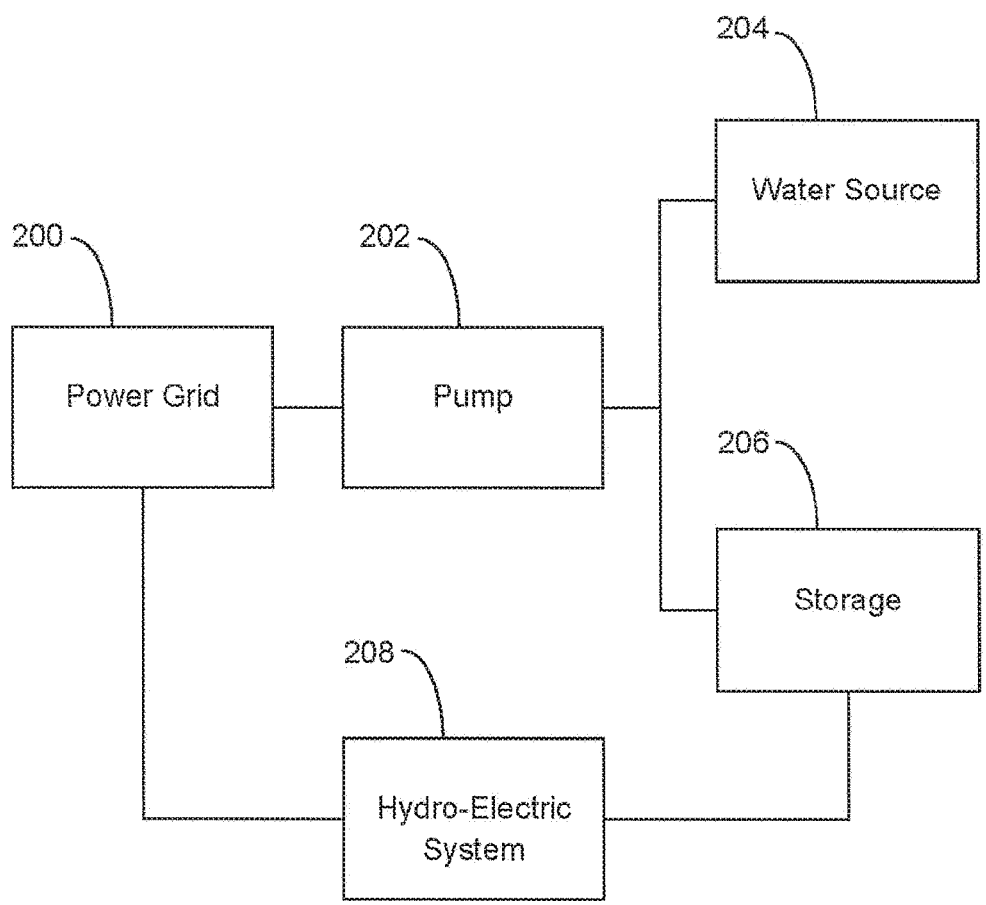
FIG. 23 is a block diagram of a power storage system using the device of FIG. 9.

Referring now to FIG. 23, shown is one embodiment of a power storage system using the device of FIG. 9. As shown, a pump 202 may be powered by an electrical power grid 200 and run when the power grid 200 is providing power to the pump in order to pump water from a water source 204 to be stored in a storage tank 206. For example, storage tank 206 may be provided at a higher elevation than hydro-electric system 208. If the power grid 200 stops providing electricity (or power otherwise becomes unavailable), the water in the storage tank 206 may be used to run the hydro-electric system 208 according to the present teachings to generate electrical power. The system could also be paired with solar and/or wind power, which may run the pump 202 during a period of time, and then utilize the water in the storage tank 206 to run the system 208 at another period of time.

Alternatively, rather than utilizing a pump 202, it will be understood that water from a water source 204 could be used to fill storage 206 if the storage is downhill from the water source. In this manner, the hydro-electric system 208 may be used to provide electric power when intermittent power is provided by the power grid 200.

In addition, it is understood that that the hydro-electric system 208 may be used to provide peak shaving. For example, the storage 206 may be filled up by the water source 204 during off-peak times. During peak power usage, the storage 206 may provide water to the hydro-electric system 208 so as to reduce the amount of electricity drawn during the peak hours and may even be used to provide excess power back to the power grid.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A hydro-electric power system for transforming mechanical power to electrical power and including an electrical power generator and a mechanical device coupled to said generator, said mechanical device generating rotational power and comprising:
   a hub;
   a first arm having a first end coupled to said hub via a hinge allowing said first arm to extend radially from and move relative to said hub;
   a first container coupled to a second end of said first arm;
   a first supporting mechanism associated with said first container or said first arm;
   a second arm having a first end coupled to said hub via a hinge allowing said second arm to extend radially from and move relative to said hub;
   a second container coupled to a second end of said second arm;
   a second supporting mechanism associated with said second container or said second arm;
   a base upon which said hub is positioned;
   a platform adapted to rotate relative to said hub about an axis of rotation;
   a track positioned on a periphery of said platform, said track having high points and low points with sections of track connected therebetween;
   said first supporting mechanism engaging with said track such that said first arm and said first container are supported by said track via said first supporting mechanism;
   said second supporting mechanism engaging with said track such that said second arm and said second container are supported by said track via said second supporting mechanism;
   wherein when said first container is at least partially filled with a fluid at a first high point of said track, said platform rotates causing said track to rotate such that the first container advances from the first high point toward a first low point of said track via a section of track connecting the first high point to the first low point; and
   wherein when said second container is emptied at a second low point of said track, said platform rotates causing said track to rotate such that the second container travels from the second low point toward a second high point of said track via a section of track connecting the second low point to the second high point.

2. The hydro-electric power system according to claim 1, wherein first and second supporting mechanisms each comprise a wheel.

3. The hydro-electric power system according to claim 1, wherein first and second supporting mechanisms are each position outboard of said first and second containers respectively relative to said hub.

4. The hydro-electric power system according to claim 1, wherein said first high point comprises a length of track and the fluid is deposited in said first container when said first container is at the first high point.

5. The hydro-electric power system according to claim 1, wherein said second low point comprises a length of track and the fluid is exhausted from the second container while said second container is at the second low point.

6. The hydro-electric power system according to claim 1,
   wherein the section of track extending from the first high point to the first low point comprise a first angle forming a ramp along which the first supporting mechanism travels; and
   wherein the section of track extending from the second low point to the second high point comprise a second angle forming a ramp along which the second supporting mechanism travels.

7. The hydro-electric power system according to claim 6, wherein said first arm is radially offset on said hub from said second arm such that when said first container reaches said first low point that said second container reaches said second high point.

8. The hydro-electric power system according to claim 7, wherein said second container is at least partially filled with a fluid when said second container reaches the second high point and said first container releases the fluid held therein just prior to said first container reaching the first low point.

9. The hydro-electric power system according to claim 6, further comprising:
   a third arm having a first end coupled to said hub via a hinge allowing said third arm to extend radially from and move relative to said hub;
   a third container coupled to a second end of said third arm;
   a third supporting mechanism associated with said third container;
   a fourth arm having a first end coupled to said hub via a hinge allowing said fourth arm to extend radially from and move relative to said hub;
   a fourth container coupled to a second end of said fourth arm; and a fourth supporting mechanism associated with said fourth bucket.

10. The hydro-electric power system according to claim 9, wherein said first arm is radially offset from said second arm relative to said hub;
wherein said third beam is radially offset from said fourth beam relative to said hub; and
wherein the radial offset between the first and second beams is different from the radial offset between the third and fourth beams.

11. The hydro-electric power system according to claim 9, wherein the sections of track extending from the third high point to the third low point comprise a third angle forming a ramp along which the third supporting mechanism travels; and
wherein the sections of track extending from the fourth low point to the fourth high point comprise a fourth angle forming a ramp along which the fourth supporting mechanism travels.

12. The hydro-electric power system according to claim 11, wherein the first container will not reach the first high point simultaneous with the third container reaching the third high point, and the second container will not reach the second low point simultaneous with the fourth container reaching the fourth low point.

13. The hydro-electric power system according to claim 1, wherein a fluid source is coupled to at least one storage tank maintained above said track, and wherein fluid is selectively added to said storage tank via a control valve.

14. The hydro-electric power system according to claim 13, wherein said storage tank comprises a concentric tank that extends at least partially above and around the periphery of the platform.

15. The hydro-electric power system according to claim 14, wherein fluid is added to said storage tank via a plurality of radially offset pipes.

16. The hydro-electric power system according to claim 1, wherein said first container comprises a door on a bottom end of said first container and an opening mechanism such that when the first container reaches the first low point, the opening mechanism causes the door to open and release the fluid through the door.

17. The hydro-electric power system according to claim 16, wherein said platform includes a plurality of openings therein, and wherein the opening mechanism opens the door when said first container is over one of said plurality of openings such that the fluid is allowed to pass through the opening.

18. The hydro-electric power system according to claim 17, wherein said plurality of openings include a series of blades positioned at an angle relative to the water falling from the container when the door opens such that the fluid passes through the series of blades providing an additive force for rotation of said platform.

19. The hydro-electric power system of claim 1, wherein when said second container reaches the second low point of said track, said first container reaches the first high point of said track.

20. The hydro-electric power system of claim 1, wherein when said second container reaches the second low point of said track, said first container is transitioning from the first high point of said track to the first low point of said track.

21. The hydro-electric power system of claim 20, wherein said first and second arms engage with said second track such that said first and second arms are supported in part by said second track.

22. The hydro-electric power system of claim 1, further comprising a plurality of supporting beams radially positioned around and coupled to said base.

23. The hydro-electric power system of claim 1, wherein said track comprises a first track, said system further comprising:
a second track positioned radially outward relative to said hub and radially inward relative to said first track, said second track having high points and low points with sections of track connected therebetween.

24. The hydro-electric power system of claim 1, wherein said first container includes a first contact guide extending from an end of said first container, said second container includes a second contact guide extending from an end of said second container, said system further comprising:
a first guide rail; and
a second guide rail;
wherein said first contact guide is adapted to interact with said first guide rail and said second contact guide is adapted to interact with said second guide rail.

25. The hydro-electric power system of claim 24, wherein said first contact guide and said second contact guide each comprise a forked member such that the first guide rail and second guide rail are maintained within the forked member of said first and second contact guides respectively.

26. The hydro-electric power system of claim 24, wherein said first contact guide and said second contact guide each comprise a roller bearing.

27. The hydro-electric power system of claim 1, wherein said platform is formed comprising a series of spokes and a central hub.

28. A power storage system for storing potential energy from a water source, comprising:
a connection to an electrical power grid;
a storage;
a pump powered by the electrical power grid and pumping water from the water source into the storage; and
the system according to claim 1 utilizing the fluid stored in the storage to generate electrical power.

29. The system of claim 28, wherein the storage stores fluid during a period of time and releases the fluid during another time to provide peak shaving of energy usage from the electrical power grid.

* * * * *